(12) United States Patent
Plotnikov et al.

(10) Patent No.: US 10,929,133 B2
(45) Date of Patent: Feb. 23, 2021

(54) APPARATUSES, METHODS, AND SYSTEMS FOR ELEMENT SORTING OF VECTORS

(71) Applicant: Intel Corporation, Santa Clara, CA (US)

(72) Inventors: Mikhail Plotnikov, Nizhny Novgorod (RU); Igor Ermolaev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 16/249,870

(22) Filed: Jan. 16, 2019

(65) Prior Publication Data

US 2019/0146792 A1 May 16, 2019

Related U.S. Application Data

(63) Continuation of application No. 15/201,138, filed on Jul. 1, 2016, now Pat. No. 10,191,744.

(51) Int. Cl.
*G06F 9/30* (2018.01)

(52) U.S. Cl.
CPC ........ *G06F 9/3016* (2013.01); *G06F 9/30021* (2013.01); *G06F 9/30036* (2013.01); *G06F 9/30192* (2013.01)

(58) Field of Classification Search
None
See application file for complete search history.

(56) References Cited

U.S. PATENT DOCUMENTS

| 4,499,555 A | * | 2/1985 | Huang | G06F 7/24 |
| 5,200,915 A | | 4/1993 | Hayami et al. | |
| 5,226,135 A | * | 7/1993 | Mishina | G06F 15/8053 |
| | | | | 712/7 |
| 6,058,405 A | * | 5/2000 | Kolte | G06T 5/20 |
| | | | | 382/262 |

(Continued)

FOREIGN PATENT DOCUMENTS

WO    2016105758 A1    6/2016

OTHER PUBLICATIONS

"Intel Intrinsics Guide," URL , [Retrieved from the Internet on Dec. 6, 2016], 2 pages.

(Continued)

*Primary Examiner* — Eric Coleman
(74) *Attorney, Agent, or Firm* — Nicholson De Vos Webster & Elliott LLP

(57) ABSTRACT

Systems, methods, and apparatuses relating to element sorting of vectors are described. In one embodiment, a processor includes a decoder to decode an instruction into a decoded instruction; and an execution unit to execute the decoded instruction to: provide storage for a comparison matrix to store a comparison value for each element of an input vector compared against the other elements of the input vector, perform a comparison operation on elements of the input vector corresponding to storage of comparison values above a main diagonal of the comparison matrix, perform a different operation on elements of the input vector corresponding to storage of comparison values below the main diagonal of the comparison matrix, and store results of the comparison operation and the different operation in the comparison matrix.

24 Claims, 26 Drawing Sheets

(56) References Cited

U.S. PATENT DOCUMENTS

| | | |
|---|---|---|
| 6,353,821 B1 | 3/2002 | Gray |
| 6,496,830 B1* | 12/2002 | Jenkins, Jr. ............. G06F 16/30 |
| 7,386,582 B2 | 6/2008 | Gustavson et al. |
| 8,972,698 B2 | 3/2015 | Hughes et al. |
| 9,372,692 B2 | 6/2016 | Hughes et al. |
| 9,996,361 B2* | 6/2018 | Mishra ................. G06F 9/3861 |
| 10,409,613 B2* | 9/2019 | Mishra ................. G06F 9/3887 |
| 2003/0033278 A1* | 2/2003 | Abe ........................... G06F 7/24 |
| 2004/0162817 A1* | 8/2004 | Boskovic ............... G06F 17/18 |
| 2006/0101014 A1 | 5/2006 | Forman et al. |
| 2006/0184765 A1 | 8/2006 | Krueger et al. |
| 2009/0303834 A1 | 12/2009 | Sengupta et al. |
| 2010/0095087 A1 | 4/2010 | Eichenberger et al. |
| 2010/0257427 A1 | 10/2010 | Xu et al. |
| 2010/0313060 A1 | 12/2010 | Bjoerklund et al. |
| 2013/0297613 A1* | 11/2013 | Yu ...................... G06F 16/2455 707/741 |
| 2014/0067466 A1 | 3/2014 | Xiao et al. |
| 2014/0189293 A1 | 7/2014 | Gopal et al. |
| 2016/0064047 A1 | 3/2016 | Tiwari et al. |
| 2016/0203105 A1 | 7/2016 | Nakanishi |
| 2017/0185403 A1* | 6/2017 | Anderson ........... G06F 9/30021 |

OTHER PUBLICATIONS

International Preliminary Report on Patentability for Application No. PCT/US2017/037536, dated Jan. 10, 2019, 6 pages.

International Search Report and Written Opinion for Application No. PCT/US2017/037536, dated Oct. 20, 2017, 9 pages.

Non-final Office Action from U.S. Appl. No. 15/201,138, dated Apr. 3, 2018, 21 pages.

Notice of Allowance from U.S. Appl. No. 15/201,138, dated Sep. 26, 2018, 5 pages.

* cited by examiner

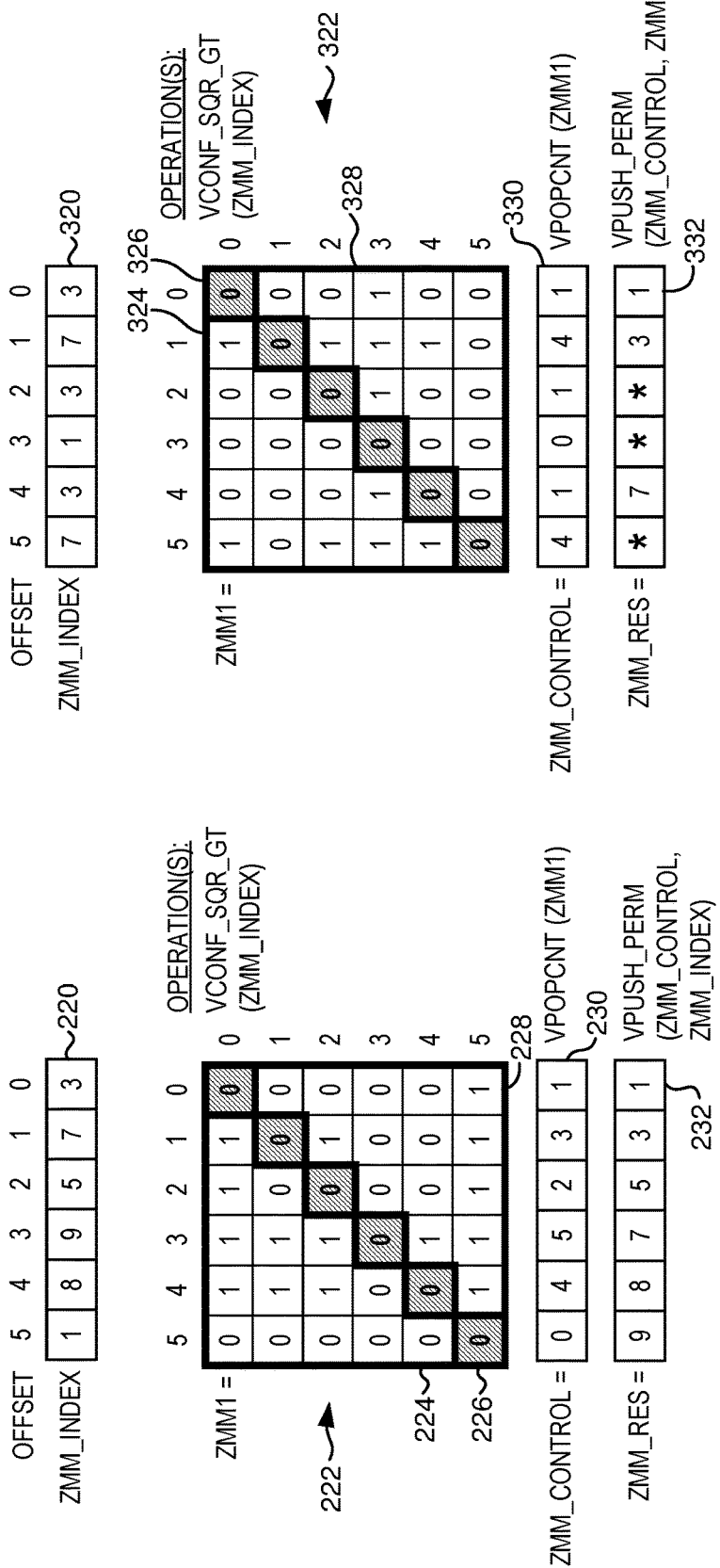

1400 

```
┌─────────────────────────────────────────────────────────────────────────┐
│   DECODING AN INSTRUCTION WITH A DECODER OF A PROCESSOR INTO A DECODED  │
│                            INSTRUCTION 1402                              │
└─────────────────────────────────────────────────────────────────────────┘
                                     │
                                     ▼
┌─────────────────────────────────────────────────────────────────────────┐
│       EXECUTING THE DECODED INSTRUCTION WITH AN EXECUTION UNIT OF THE    │
│      PROCESSOR TO PROVIDE STORAGE FOR A COMPARISON MATRIX TO STORE A     │
│        COMPARISON VALUE FOR EACH ELEMENT OF AN INPUT VECTOR COMPARED     │
│    AGAINST THE OTHER ELEMENTS OF THE INPUT VECTOR, PERFORM A COMPARISON  │
│     OPERATION ON ELEMENTS OF THE INPUT VECTOR CORRESPONDING TO STORAGE   │
│      OF COMPARISON VALUES ABOVE A MAIN DIAGONAL OF THE COMPARISON MATRIX,│
│        PERFORM A DIFFERENT OPERATION ON CORRESPONDING ELEMENTS OF THE    │
│      INPUT VECTOR CORRESPONDING TO STORAGE OF COMPARISON VALUES BELOW    │
│     THE MAIN DIAGONAL OF THE COMPARISON MATRIX, AND STORE RESULTS OF THE │
│      COMPARISON OPERATION AND THE DIFFERENT OPERATION IN THE COMPARISON  │
│                               MATRIX 1404                                │
└─────────────────────────────────────────────────────────────────────────┘
```

FIG. 14

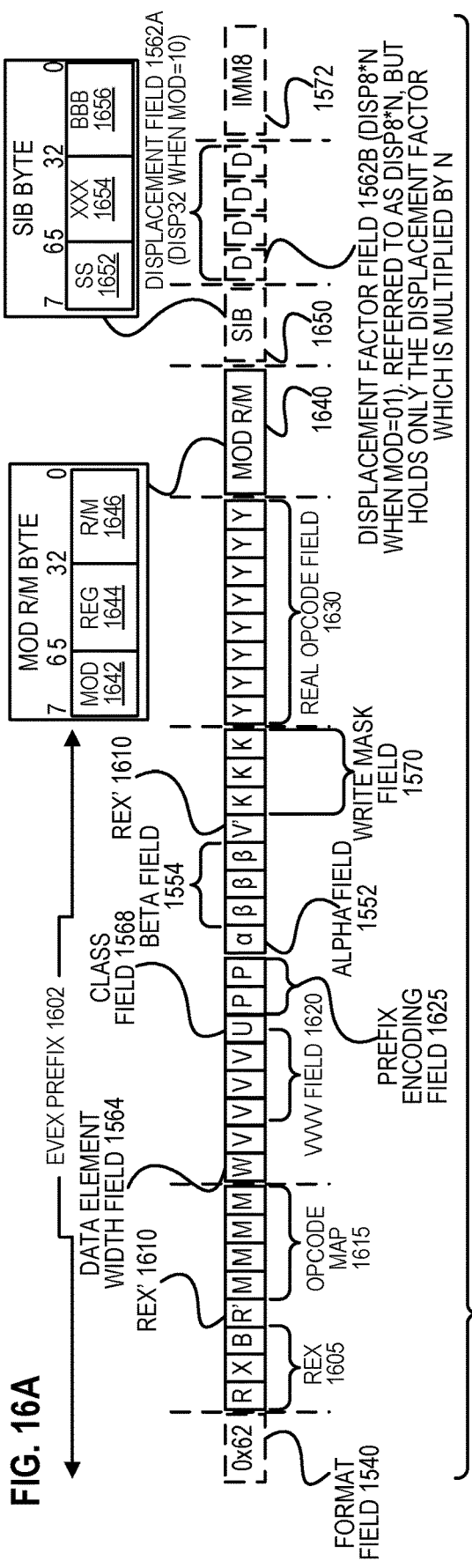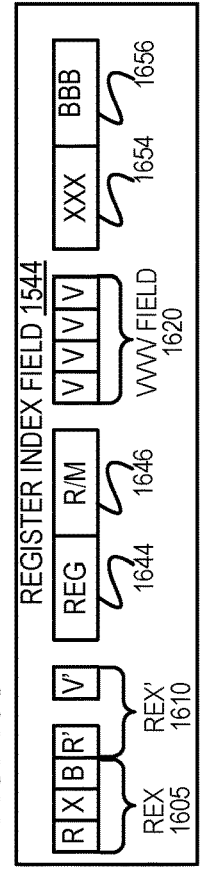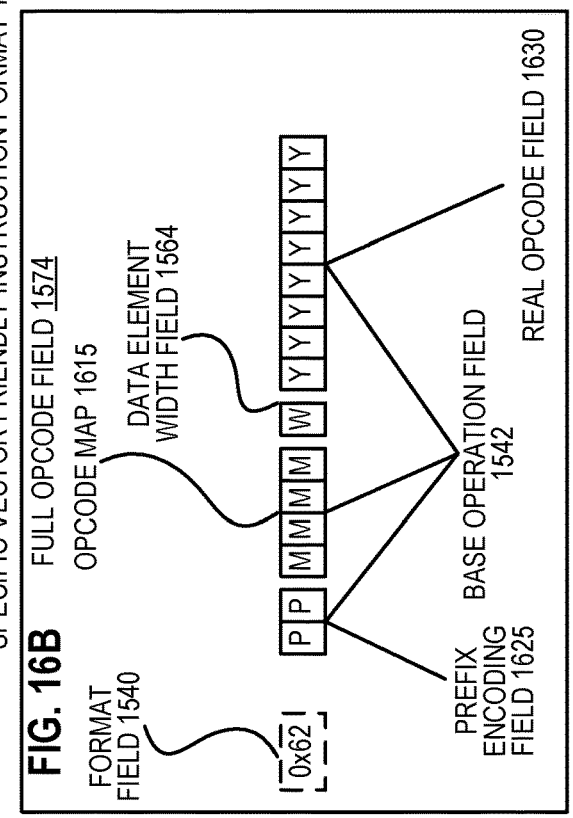

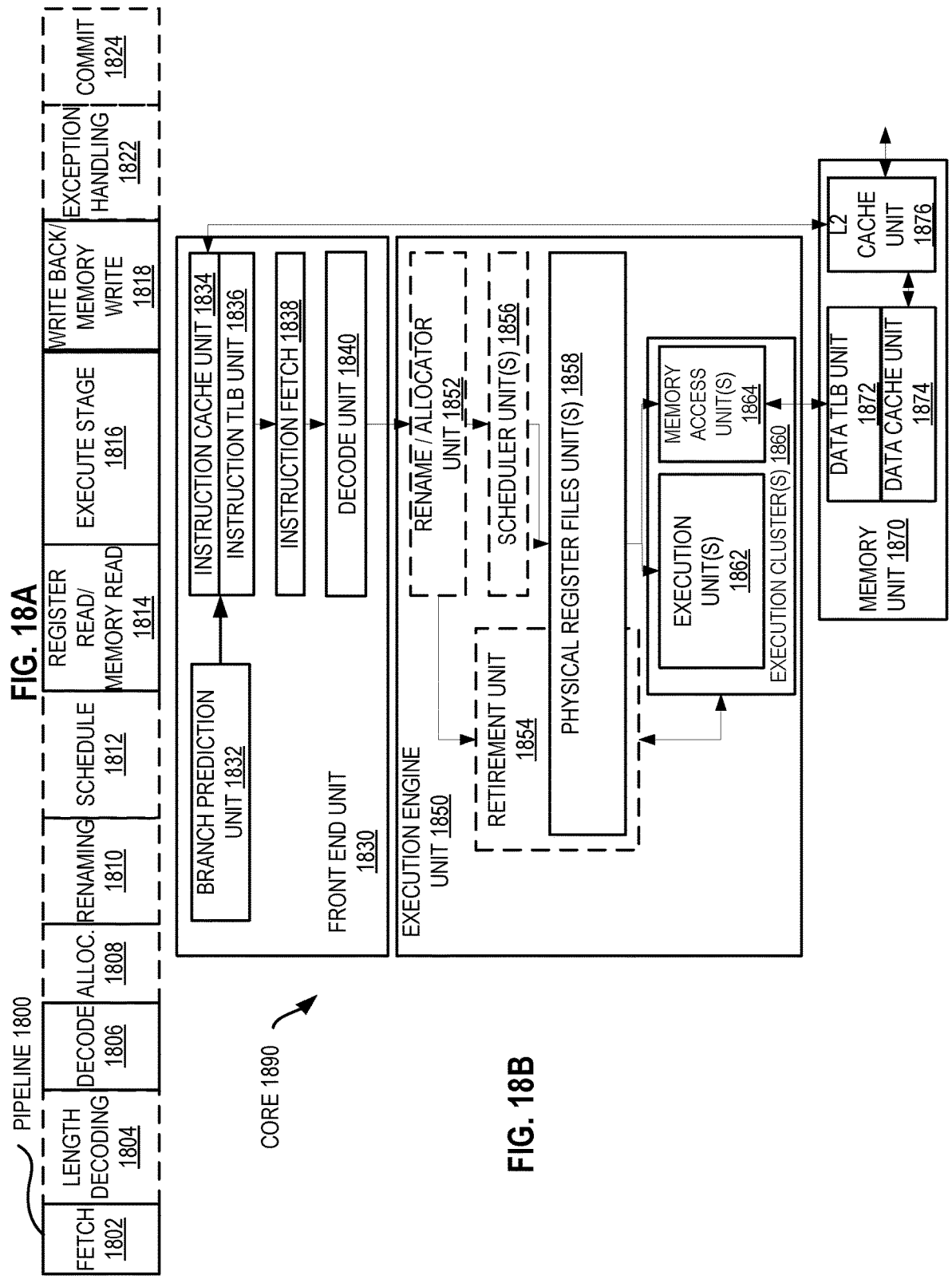

APPARATUSES, METHODS, AND SYSTEMS FOR ELEMENT SORTING OF VECTORS

CROSS REFERENCE TO RELATED APPLICATIONS

The present patent application is a continuation application claiming priority from U.S. patent application Ser. No. 15/201,138, filed Jul. 1, 2016, and titled: "Apparatuses, Methods, and Systems for Element Sorting of Vectors", which is incorporated herein by reference in its entirety.

TECHNICAL FIELD

The disclosure relates generally to electronics, and, more specifically, an embodiment of the disclosure relates to apparatuses, methods, and systems for element sorting of vectors.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 2 illustrates a sorting operation according to embodiments of the disclosure.

FIG. 3 illustrates a sorting operation according to embodiments of the disclosure.

FIG. 14 illustrates a flow diagram according to embodiments of the disclosure.

FIG. 16A is a block diagram illustrating fields for the generic vector friendly instruction formats in FIGS. 15A and 15B according to embodiments of the disclosure.

FIG. 16B is a block diagram illustrating the fields of the specific vector friendly instruction format in FIG. 16A that make up a full opcode field according to one embodiment of the disclosure.

FIG. 16C is a block diagram illustrating the fields of the specific vector friendly instruction format in FIG. 16A that make up a register index field according to one embodiment of the disclosure.

FIG. 18A is a block diagram illustrating both an exemplary in-order pipeline and an exemplary register renaming, out-of-order issue/execution pipeline according to embodiments of the disclosure.

FIG. 18B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. One non-limiting example of an operation is a permute operation to input an (e.g., numerically) unsorted plurality of elements and output a (e.g., numerically) sorted plurality of elements. In certain embodiments, a permute operation may be accomplished with execution of a single instruction or a plurality of instructions.

Figure 1:
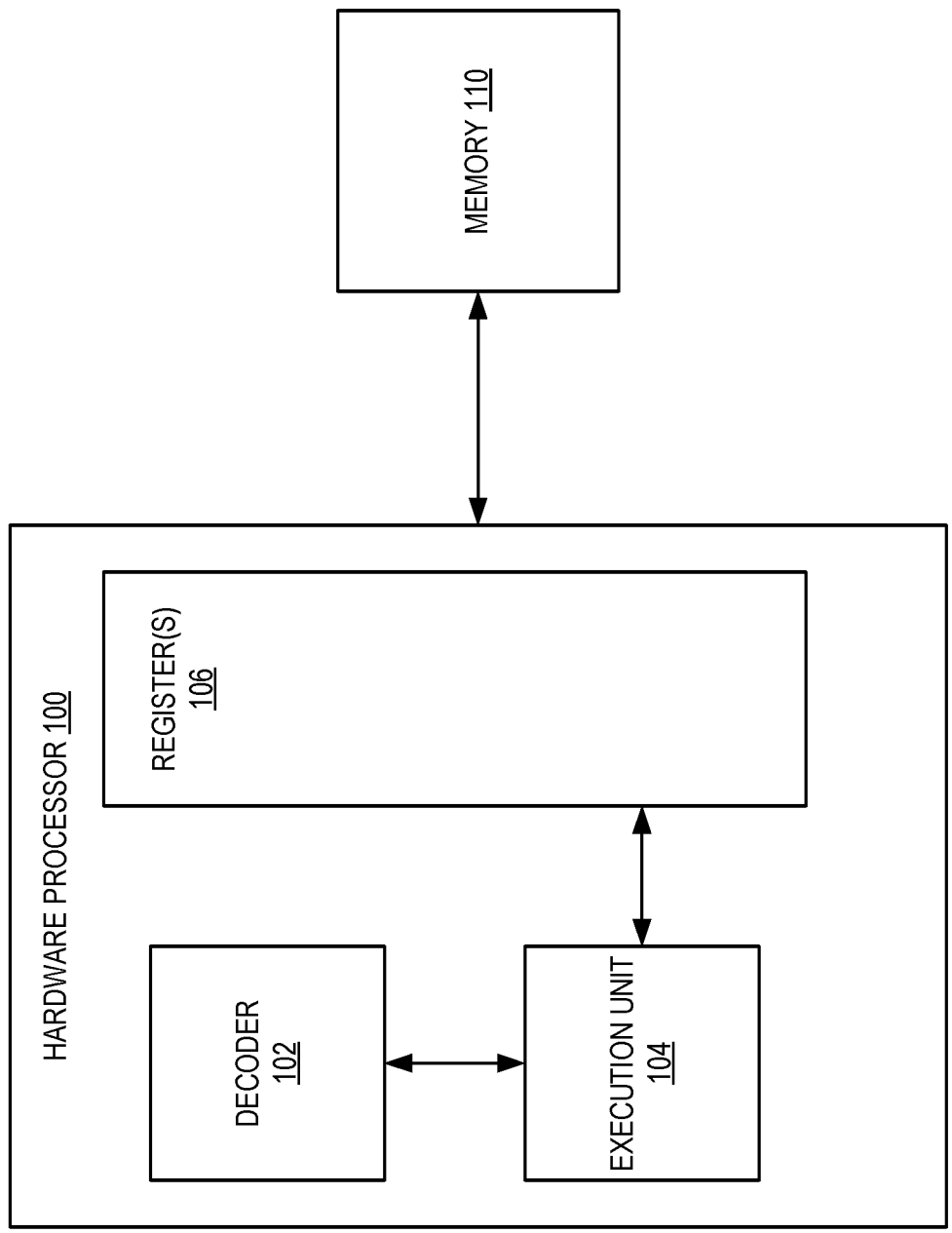
FIG. 1 illustrates a hardware processor coupled to a memory according to embodiments of the disclosure.

FIG. 1 illustrates a hardware processor 100 coupled to (e.g., connected to) memory 110 according to embodiments of the disclosure. Depicted hardware processor 100 includes a hardware decoder 102 (e.g., decode unit) and a hardware execution unit 104. Depicted hardware processor 100 includes register(s) 106. Registers may include one or more registers to perform operations in, e.g., additionally or alternatively to access of (e.g., load or store) data in memory 110. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein.

Hardware decoder 102 may receive an (e.g., single) instruction (e.g., macro-instruction) and decode the instruction, e.g., into micro-instructions and/or micro-operations. Hardware execution unit 104 may execute the decoded instruction (e.g., macro-instruction) to perform an operation or operations. An instruction to be decoded by decoder 102 and for the decoded instruction to be executed by execution unit 104 may be any instruction discussed herein, e.g., in reference to FIGS. 4-13. Certain embodiments herein may provide for an (e.g., in register) cross-lane comparison instruction with different operations for comparisons to-the-right and to-the-left of the element being compared. Certain embodiments herein may provide for a numerical sort instruction or sequence of instructions. Certain embodiments herein may provide for an (e.g., in register) cross-lane comparison instruction with an exclusion of comparing one or more of the input elements.

Certain embodiments herein resolve the issue of duplicate values appearing multiple times when sorting the values, e.g., inside a register or registers. An example instruction or instruction sequence is an all-to-all (e.g., square) comparison of each element to all the elements. Another example is a comparison of each element (e.g., location) to all the other elements (e.g., excluding the value being compared). In one embodiment based on the result of the comparisons, the elements are permuted inside a register resulting in an ordered disposition of all elements (e.g., of increasing value in order from the right to the left or the left to the right). Turning now to FIGS. 2 and 3, FIG. 2 illustrates a sorting operation according to embodiments of the disclosure, and FIG. 3 illustrates a sorting operation according to embodiments of the disclosure.

One example of a sorting sequence is three operations:
(1) ZMM1=VCONF_SQR_GT(ZMM_INDEX);
(2) ZMM_CONTROL=VPOPCNT(ZMM1); and
(3) ZMM_RES=VPUSH_PERM(ZMM_INDEX, ZMM_CONTROL).

Where (1) is an embodiment of an (e.g., in register) operation to populate a comparison matrix (e.g., comparison matrix 222 in FIG. 2 and comparison matrix 322 in FIG. 3) by comparing each value of an input vector (e.g., input vector 220 in FIG. 2 and input vector 320 in FIG. 3) against all the values (e.g., element positions) of the input vector according to a single type of comparison operation (e.g., a greater than (GT) operation in FIGS. 2 and 3). ZMM_INDEX may be a register storing the data to be sorted in FIGS. 2 and 3. Note that although the offset (e.g., the index into the vector or packed data) is shown as increasing from right to left, the offset may increase from left to right. The VCONF_SQR_GT operation (e.g., instruction) may include the specifications of a square conflict operation (e.g., take an element and compare it to all other elements in the input vector; repeat that for all elements) with a comparison operation of greater than (GT).

Where (2) is an embodiment of an operation to populate a control vector (e.g., control vector 230 in FIG. 2 and control vector 330 in FIG. 3). For example, the sum of the values (e.g., the number of bits set high) in each column of the comparison matrix. Note, although a two dimensional square comparison matrix is shown for illustrative purposes, it may be placed in a register in any way, for example, each row of a comparison matrix as a portion of a one dimensional array (e.g., mapped to a register). In one embodiment, a multidimensional array (e.g., matrix) is mapped to linear storage, for example, in column-major order or row-major order.

Where (3) is an embodiment of an (e.g., in register) operation to populate an output vector (e.g., output vector 232 in FIG. 2 and output vector 332 in FIG. 3) based on the input operands of the input vector (e.g., input vector 220 in FIG. 2 and input vector 320 in FIG. 3) and the control vector (e.g., control vector 230 in FIG. 2 and control vector 330 in FIG. 3). The control vector (e.g., control vector 230 in FIG. 2 and control vector 330 in FIG. 3) may indicate as its values the bit positions (e.g., offset) for the corresponding input vector (e.g., input vector 220 in FIG. 2 and input vector 320 in FIG. 3), for example, the value stored at the last offset position (e.g., offset 5) of control vector 230 in FIG. 2 is the value of zero and the value stored at the last offset position (e.g., offset 5) of input vector 220 in FIG. 2 is the value of 1, and thus the value of 1 is to be stored in the zero offset in the output vector 232. As all the elements in the input vector 220

(e.g., input register) in FIG. 2 are unique, the population of the comparison matrix (e.g., by operation (1) above) and/or the control vector (e.g., by operation (2) above) generates a unique offset in the output vector for the input vector. However, in FIG. 3 the values of 3 and 7 are duplicated (e.g., appear more than once) in the input vector 320, and thus the single type of comparison operation (e.g., a greater than (GT) operation in each of FIGS. 2 and 3) does not take into account the duplicates and thus the same values will be permuted to the same offset in the output vector, e.g., the PUSH_PERM operation (e.g., instruction) will permute duplicated values to the same position in the resulting output vector. The * in FIG. 3 thus illustrates a loss of data (e.g., nothing is written to that element) in the output vector 332 as compared to the input vector 320. Note that although a ZMM register is utilized as an example, one or more other registers of any bit sizes may be utilized in certain embodiments. Note that the operation names (e.g., VCONF_SQR_GT) are merely examples and other names or indicators may be used. The operation (e.g., instruction) names are utilized in certain figures as examples.

Certain embodiments herein provide for an operation, e.g., an instruction or sequence of instructions, to perform two or more different types of operations on an input vector, e.g., to populate a comparison matrix. Certain embodiments herein provide for an operation, e.g., an instruction or sequence of instructions, to perform an anti-symmetrical operation on a portion of less than all of an input vector or a comparison matrix, e.g., to populate at least a portion of a comparison matrix. In one embodiment, different comparisons are performed for the triangular section above (e.g., and including) main diagonal (e.g., triangular section 224 above main diagonal 226 (shown as hashed) in FIG. 2 and triangular section 324 above main diagonal 326 (shown as hashed) in FIG. 3) and the triangular section below (e.g., and including) the main diagonal (e.g., triangular section 228 below main diagonal 226 in FIG. 2 and triangular section 328 below and/or including main diagonal 326 in FIG. 3). For example, in FIG. 4 below, a greater than or equal (GE) operation may be performed for comparisons with elements to the left (e.g., or the right) from the taken element and a greater than (GT) operation may be performed for comparisons with elements to the right (e.g., or the left) from the taken element (e.g., by single VCONF_SQR_RL instruction) and, for example, then generate a permute (or sort) control based on this result. The result of such an instruction in this embodiment has different values for all duplicates and thus subsequent permutation (or sorting) will not lead to (e.g., essential) information loss. Certain embodiments herein provide for stable sorting, for example, preserving order of values (e.g., records) with equal indexes (e.g., keys). In one embodiment, a data structure to be permuted (or sorted) is a list having each data element (e.g., record) referenced by a respective index (e.g., key). The term greater than or equal to may refer to an operation that returns a true (e.g., logic 1) when a first value is either of greater than and equal to a second value.

Note the term main diagonal may refer to a diagonal running from the top right corner to the bottom left of a matrix (e.g., sometimes referred to as the antidiagonal), but it may also refer to a diagonal running from the top left corner to the bottom right corner of the matrix, for example, depending on the orientation for which direction the offset of the input vector increases.

In certain embodiments, a triangular shaped area conflict operation (e.g., instruction) (e.g., VCONFLICT or VCONF_TRI_EQ) may include an "equal to" operation. In one embodiment, an operation (e.g., instruction) adds additional bits for duplicates in the higher left (or bottom right) triangular section over the main diagonal and so duplicated elements are differentiated, e.g., in ZMM_CONTROL.

One example of a sorting sequence for an input vector with duplicates is five operations:
(1) ZMM1=VCONF_SQR_GT(ZMM_INDEX)
(2) ZMM2=VCONF_TRI_EQ (ZMM_INDEX)
(3) ZMM3=VPOR (ZMM1,ZMM2)
(4) ZMM_CONTROL=VPOPCNT(ZMM3)
(5) ZMM_RES=VPUSH_PERM(ZMM_INDEX, ZMM_CONTROL), where (2) may be done in parallel with (1) and then results are combined to a single vector, e.g., by VPOR instruction. In one embodiment, this sorting sequence is 5 instructions and $3*N*(N-1)/2$ comparisons, where N is a number of elements in an input vector (e.g., register).

Another example of a sorting sequence for an input vector with duplicates is three operations and $N*(N-1)$ comparisons:
(1) ZMM1=VCONF_SQR_RL(ZMM_INDEX,imm8= GT:GE)
(2) ZMM_CONTROL=VPOPCNT(ZMM1)
(3) ZMM_RES=VPUSH_PERM (ZMM_INDEX, ZMM_CONTROL), which may be the same number of operations (e.g., instructions) as for the non-duplicate case above and two operations (e.g., instructions) shorter than the five operation (e.g., instruction) sequence immediately above. In one embodiment, a compiler or binary translator may detect the five operation (e.g., instruction) sequence and replace it with the three operation (e.g., instruction) sequence, e.g., for full in-register sorting no matter if there are duplicates or not.

In one embodiment, an instruction has the following format for its fields: VCONF_SQR_RL{B,W,D,Q} destination, source, comparison values (e.g., immediate value), where { } indicates example size of supported elements, e.g., byte, word, doubleword, and quadword, respectively. Pseudocode for the performance of this instruction may be as follows:
with (KL,VL)=for example, (64,512), (32,512), (16,512), (8,512) //where KL is the number of elements in the source/destination vector and VL is the vector length,
dest=destination register, memory address, or immediate value,
source=source register, memory address, or immediate value,
S=VL/KL //size of each element in bits
Op0=imm8[3:0] //operation code for the first operation (e.g., for one of the rightmost or leftmost elements)
Op1=imm8[7:4] //operation code for the second (e.g., different) operation (e.g., for the other of the leftmost or rightmost elements)
Operation:

```
for (j=0; j<KL; j++){
    i = j*S
    for (k=0; k<j; k++ ){
        m = k*S
        dest[i+k] = (src[i+S-1:i] Op0 src[m+S-1:m]) ? 1:0
    }
    for (k=j+1; k<KL; k++ ){
        m = k*S
        dest[i+k] = (src[i+S-1:i] Op1 src[m+S-1:m]) ? 1:0
    }
}
```

In one embodiment, this may be described as: in a loop going through all KL positions in a source operand; for each position take a corresponding element as a first operand of a comparison; in a loop over positions in the source operand take an element from the corresponding position of the source operand (e.g., excluding the first operand of the comparison) as a second operand of the comparison; for the elements which are on the positions to the right from the first operand of the comparison, first comparison operation is encoded (e.g., in imm8[3:0]); for elements which are on the positions to the left, second comparison operation is encoded (e.g., in imm8[7:4]). In one embodiment, results of comparisons are stored in a destination (e.g., in a comparison matrix) in an element position corresponding to the first operand of the comparison and a bit offset corresponding to the position of the second operand of the comparison.

Comparison operations (e.g., with the operation type determined from an encoded value in an immediate operand) may be encoded by pre-defined encoding, for example, greater than (GT)=0, greater than or equal to (GE)=1, equal to (EQ)=2, less than or equal to (LE)=3, less than (LT)=4, not equal (NE)=5, etc. In one embodiment a plurality of bits may be used for encoding, for example, 4 bits for encoding to allow identification of up to 16 different operations to be encoded. In one embodiment, the lower four bits (e.g., of imm8) are for the operation which is to be used for comparison to the right, and the upper four bits (e.g., of imm8) are for the operation which is to be used for comparison to the left. Although certain embodiments herein discuss a GE operation on the leftmost (e.g., upper triangular section in a 2D comparison matrix or visualization of a comparison matrix) element(s) and GT operation on the rightmost (e.g., lower triangular section in a 2D comparison matrix or visualization of a comparison matrix) element(s), other operations (e.g., pairs of different operations) may be utilized.

In the figures herein, e.g., FIGS. 4-12, data is depicted in the registers. In other embodiments, some or all of the data may be accessed in (e.g., system) memory. The input and output vector value and sizes are also examples, and other values and sizes may be utilized. The data may be ordered according to big-endian or little-endian order, e.g., with the main diagonal swapping direction accordingly.

Figure 4:
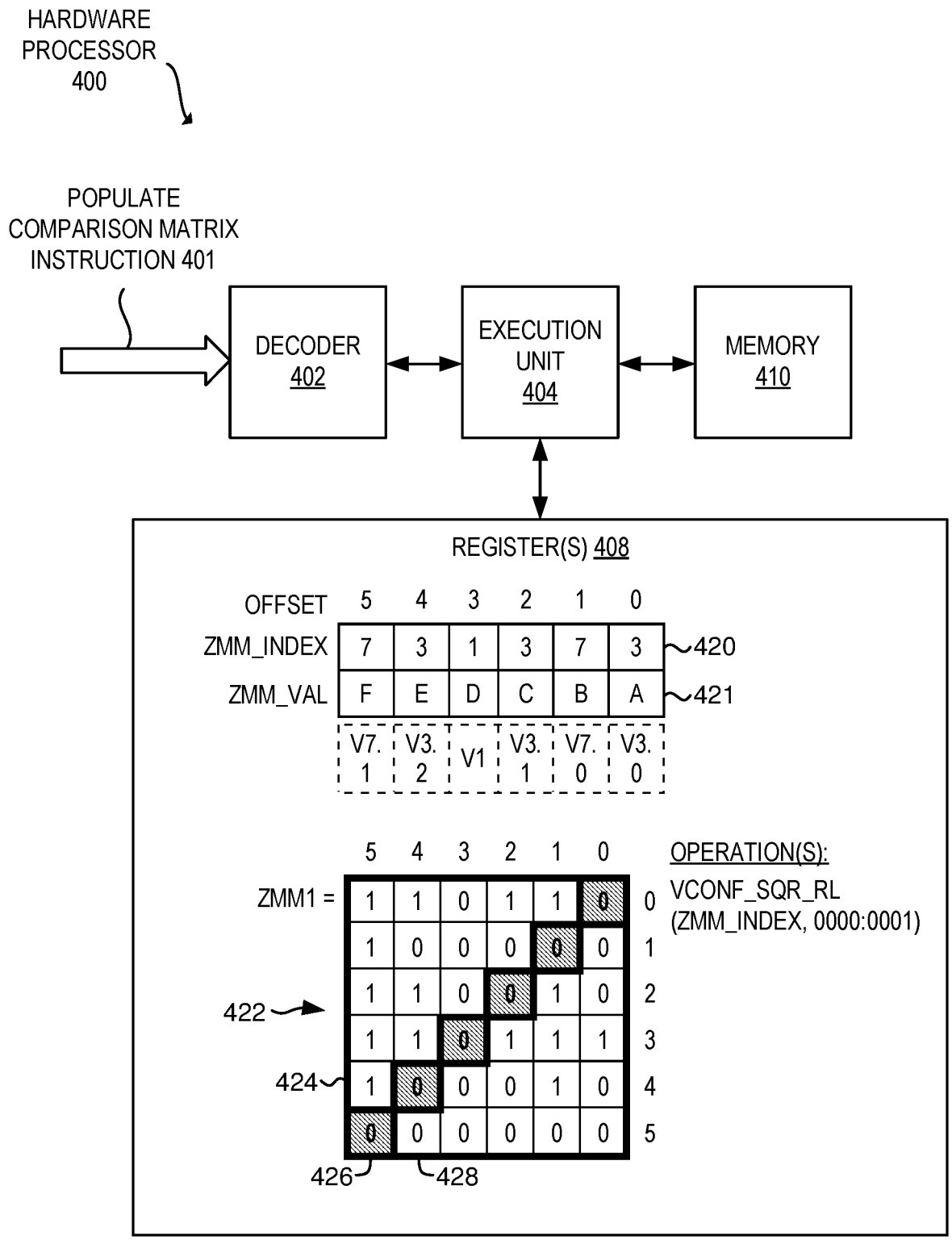
FIG. 4 illustrates a hardware processor to decode and execute a populate comparison matrix instruction according to embodiments of the disclosure.

FIG. 4 illustrates a hardware processor 400 to decode and execute a populate comparison matrix instruction 401 according to embodiments of the disclosure. Instruction 401 (e.g., single instruction) may be decoded (e.g., into micro-instructions and/or micro-operations) by decode unit 402 and the decoded instruction may be executed by the execution unit 404. Data may be accessed in register(s) 408 and/or memory 410. In certain embodiments, populate comparison matrix instruction 401 (e.g., VCONF_SQR_RL), when executed, is to cause the comparison matrix 422 to be populated, e.g., from input operands of the input vector 420 and the two types of operations to be performed. In the depicted embodiment, the elements of input vector 420 corresponding to storage of comparison values above the main diagonal 426 (e.g., the upper triangular section 424) have a first comparison operation performed, e.g., the imm8 [3:0]=0001 encoding indicating this is a greater than or equal to (GE) operation. In the depicted embodiment, the elements of input vector 420 corresponding to storage of comparison values below the main diagonal 426 (e.g., the lower triangular section 428) have a second (e.g., different than the first) comparison operation performed, e.g., the imm8[7:4]=0000 encoding indicating this is a greater than (GT) operation. In certain embodiments, each element of value input vector 421 is associated (e.g., mapped one-to-one) to an index value of the index values in the (e.g., index) input vector 420. In a sorting embodiment, input vector 420 (e.g., ZMM_INDEX) is the key (by which structures are sorted) and the value input vector 421 (e.g., ZMM_VAL) stores the values (which are sorted by the key). Certain embodiments herein thus provide for sorting of key and value data structures by using comparisons of the keys. In another embodiment, shown in the dotted boxes, a duplicate value vector is included to indicate the number of duplicate values, for example, containing the version number (e.g., version 0, 1, 2, 3, etc.) and/or value.

In the depicted embodiment, there are six elements (e.g., KL) in the input vector 420 (e.g., ZMM_INDEX). Each vertical axis and horizontal axis is the same element offset in all vectors. In one embodiment, upper bit positions greater than position 5 (element 6) of elements in the input register ZMM1 are all zeroes and not shown.

In one embodiment, the main diagonal (e.g., main diagonal 426) may be populated with zero values without performing a comparison as this maps to an input vector element (e.g., location) being compared to the same input vector element (e.g., location). One or more mask registers (e.g., one or more of k1-k7 write mask registers) may be used as a write-mask for the destination operand.

Figure 5:
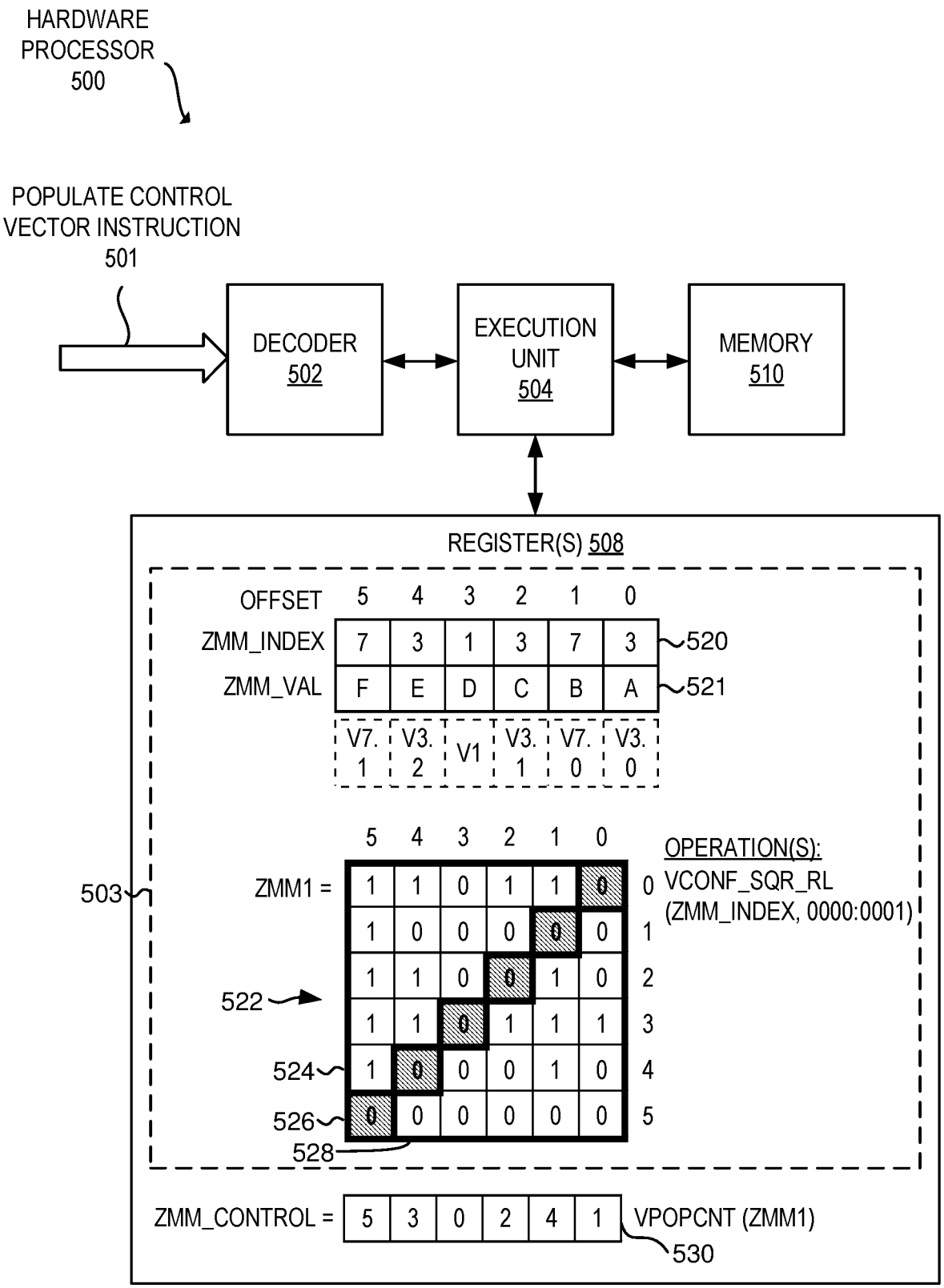
FIG. 5 illustrates a hardware processor to decode and execute a populate control vector instruction according to embodiments of the disclosure.

FIG. 5 illustrates a hardware processor 500 to decode and execute a populate control vector instruction 501 according to embodiments of the disclosure. Instruction 501 (e.g., single instruction) may be decoded (e.g., into micro-instructions and/or micro-operations) by decode unit 502 and the decoded instruction may be executed by the execution unit 504. Data may be accessed in register(s) 508 and/or memory 510. In certain embodiments, populate control vector instruction 501 (e.g., VPOPCNT), when executed, is to cause the output of control vector 530 from the comparison matrix 522, e.g., from input operand of the comparison matrix 522. For example, instruction 501 may determine the order of the input vector offsets in the output vector, e.g., by adding each column of comparison matrix 522.

In certain embodiments, one or more of the other operations 503 may be performed by execution of another instruction or instruction sequence, e.g., by instruction 401 in FIG. 4, and the (e.g., output) data available to instruction 501. Alternatively, in certain embodiments the other operations 503 are performed by execution of instruction 501. Similar components, operations, etc. in different figures may be referred to with similar reference. numbers.

Figure 6:
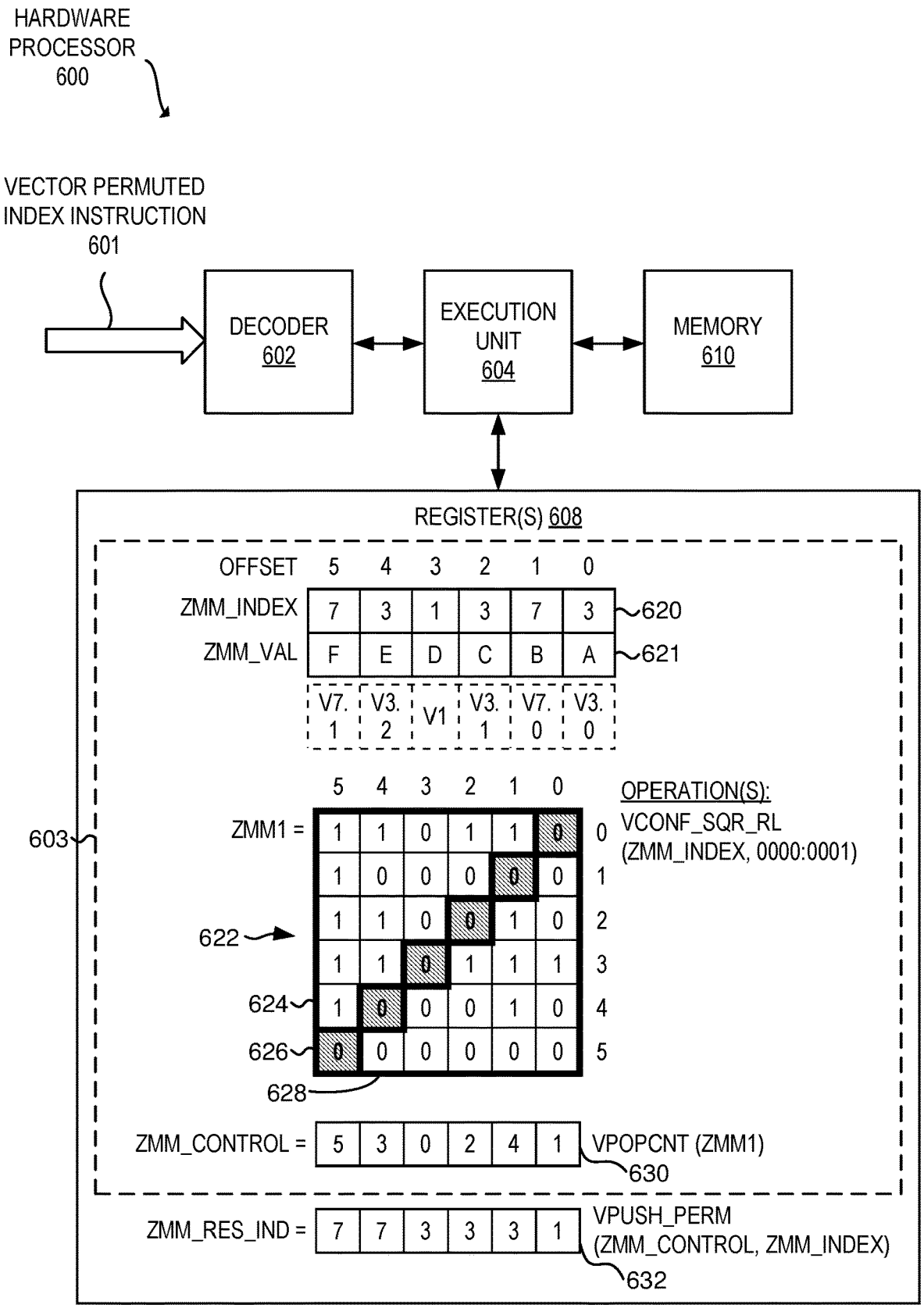
FIG. 6 illustrates a hardware processor to decode and execute a vector permuted index instruction according to embodiments of the disclosure.

FIG. 6 illustrates a hardware processor 600 to decode and execute a vector permuted index instruction 601 according to embodiments of the disclosure. Instruction 601 (e.g., single instruction) may be decoded (e.g., into micro-instructions and/or micro-operations) by decode unit 602 and the decoded instruction may be executed by the execution unit 604. Data may be accessed in register(s) 608 and/or memory 610. In certain embodiments, each element of value input vector 621 is associated (e.g., mapped) to the index values in the (e.g., index) input vector 620. In a sorting embodiment, input vector 620 (e.g., ZMM_INDEX) is the key (by which structures are sorted) and the value input vector 621 (e.g., ZMM_VAL) stores the values (which are sorted by the key). Certain embodiments herein thus provide for sorting of key and value data structures by using comparisons of the keys. In certain embodiments, vector permuted index instruction 601 (e.g., VPUSH_PERM), when executed, is to cause the output of (e.g., numerically sorted) output vector 632 (e.g., of indexes) from the control vector 630, e.g., from input operands of the control vector 630 and the (e.g., index)

input vector 620. For example, instruction 601 may place each element of (e.g., index) input vector 620 into an element position in (e.g., index) output vector 632 according to the offset value in the control vector 630, e.g., the second from the right element (offset 1) of control vector 630 is a four which indicates to the execution unit 604 to place a value of seven (offset 1 in input vector 620) in the output vector 632 in the offset 4 place. In certain embodiments, the duplicate values (e.g., of indexes) are placed adjacent to each other (e.g., the two 7s in output vector 632).

In certain embodiments, one or more of the other operations 603 may be performed by execution of another instruction or instruction sequence, e.g., by instruction 401 in FIG. 4 and/or 501 in FIG. 5, and the (e.g., output) data available to instruction 601. Alternatively, in certain embodiments the other operations 603 are performed by execution of instruction 601. Similar components, operations, etc. in different figures may be referred to with similar reference numbers.

Figure 7:
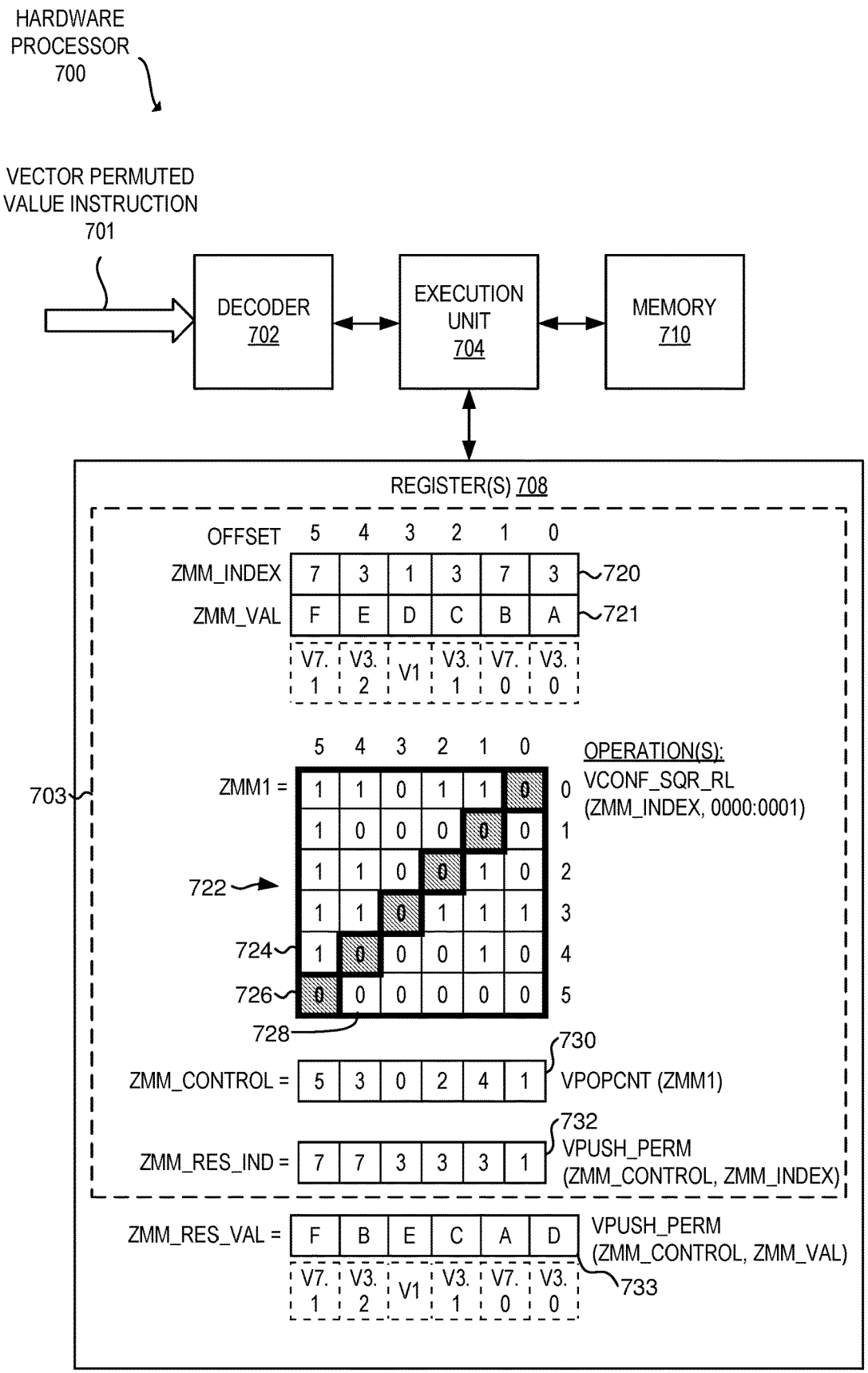
FIG. 7 illustrates a hardware processor to decode and execute a vector permuted value instruction according to embodiments of the disclosure.

FIG. 7 illustrates a hardware processor 700 to decode and execute a vector permuted value instruction 701 according to embodiments of the disclosure. Instruction 701 (e.g., single instruction) may be decoded (e.g., into micro-instructions and/or micro-operations) by decode unit 702 and the decoded instruction may be executed by the execution unit 704. Data may be accessed in register(s) 708 and/or memory 710. In certain embodiments, vector permuted value instruction 701 (e.g., VPUSH_PERM), when executed, is to cause the output of (e.g., numerically sorted) value output vector 733 from the control vector 730, e.g., from input operands of the control vector 730 and the value input vector 721. In certain embodiments, each element of value input vector 721 is associated (e.g., mapped with the same offset) to the index values in the (e.g., index) input vector 720. In a sorting embodiment, input vector 720 (e.g., ZMM_INDEX) is the key (by which structures are sorted) and the value input vector 721 (e.g., ZMM_VAL) stores the values (which are sorted by the key). Certain embodiments herein thus provide for sorting of key and value data structures by using comparisons of the keys. For example, instruction 701 may place each element of value input vector 721 into an element position in value output vector 733 according to the offset value in the control vector 730, e.g., the second from the right element (offset 1) of control vector 730 is a four which indicates to the execution unit 704 to place an associated value of "B" of the value input vector 721 (same offset of 1 in value input vector 721) in the value output vector 733 in its offset 4 place. The letter B, and the other letters, are examples of variables representing what a value may be. A value may be any value, e.g., a number or string of numbers. In the depicted embodiment, after vector permutated value instruction 701 is executed (e.g., committed), ZMM_RES_IND=7,7,3,3,3,1 and ZMM_RES_VAL=F,B,E,C,A,D. Thus certain embodiments here provide that the order of corresponding, indexed values are preserved, e.g., for the indices (e.g., keys) equal to 3 here, the permuted order of values output is E,C,A, and not ACE or EAC. This may be generally referred to as stable sorting, e.g., the relative order of records with duplicate (e.g., equal) keys is maintained.

In certain embodiments, one or more of the other operations 703 may be performed by execution of another instruction or instruction sequence, e.g., by instruction 401 in FIG. 4, 501 in FIG. 5, and/or instruction 601 in FIG. 6 and the (e.g., output) data available to instruction 701. Alternatively, in certain embodiments the other operations 703 are performed by execution of instruction 701. Similar components, operations, etc. in different figures may be referred to with similar reference numbers.

Figure 8:
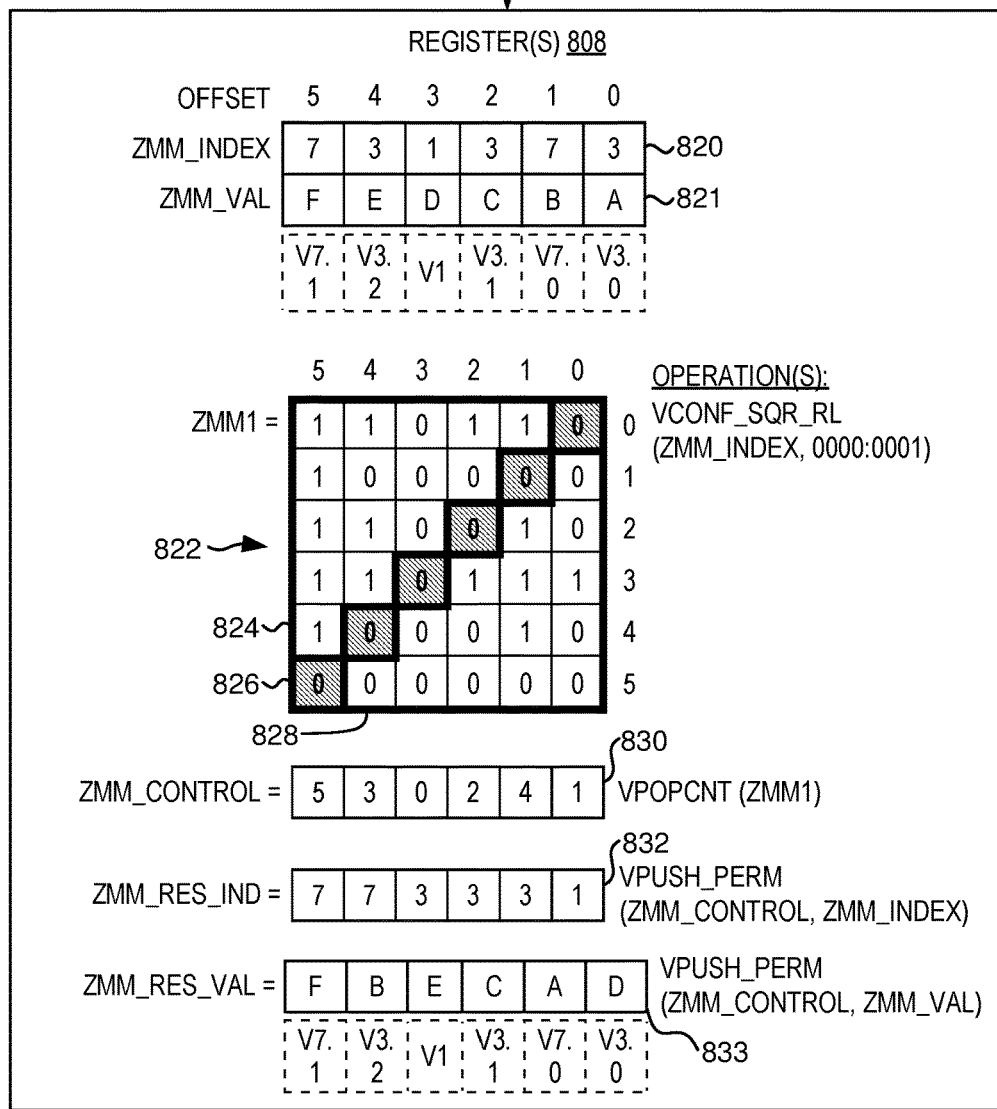
FIG. 8 illustrates a hardware processor to decode and execute a vector permute instruction according to embodiments of the disclosure.

FIG. 8 illustrates a hardware processor 800 to decode and execute a vector permute instruction 801 according to embodiments of the disclosure. Instruction 801 (e.g., single instruction) may be decoded (e.g., into micro-instructions and/or micro-operations) by decode unit 802 and the decoded instruction may be executed by the execution unit 804. Data may be accessed in register(s) 808 and/or memory 810. In certain embodiments, vector permute instruction 801 when executed, is to cause the output of (e.g., numerically sorted) output vector 832 (e.g., index output vector) and/or the output of the corresponding value output vector 833. Similar components, operations, etc. in different figures may be referred to with similar reference numbers.

Another example of a sorting sequence for an input vector with duplicates is five operations:

(1) ZMM1=VCONF_TRI_GE(ZMM_INDEX)
(2) ZMM_VERT=VPOPCNT(ZMM1)
(3) ZMM_HORIZ=VCPOPCNTXOR(ZMM1, ZMM_THERM)
(4) ZMM_CONTROL=VPADD(ZMM_VERT, ZMM_HORIZ)
(5) ZMM_RES=VPUSH_PERM (ZMM_INDEX, ZMM_CONTROL).

In one embodiment, this sorting sequence is 5 instructions and $N*(N-1)/2$ comparisons (e.g., triangle form of VCONF), where N is a number of elements in an input vector (e.g., register). Certain embodiments herein may provide for fewer comparisons, e.g., where the number of comparisons may be a performance bottleneck if a processor does not have enough comparator circuits (e.g., comparators) to do all the comparisons, e.g., in parallel. Thus reducing the total number of comparisons may be critical for performance in certain embodiments. In certain embodiments, a triangular section instruction may perform a comparison, e.g., to populate a subset of less than all of a comparison matrix. In one embodiment, an operation or instruction may initially populate a comparison matrix with a set value, e.g., all zeroes.

Figure 9:
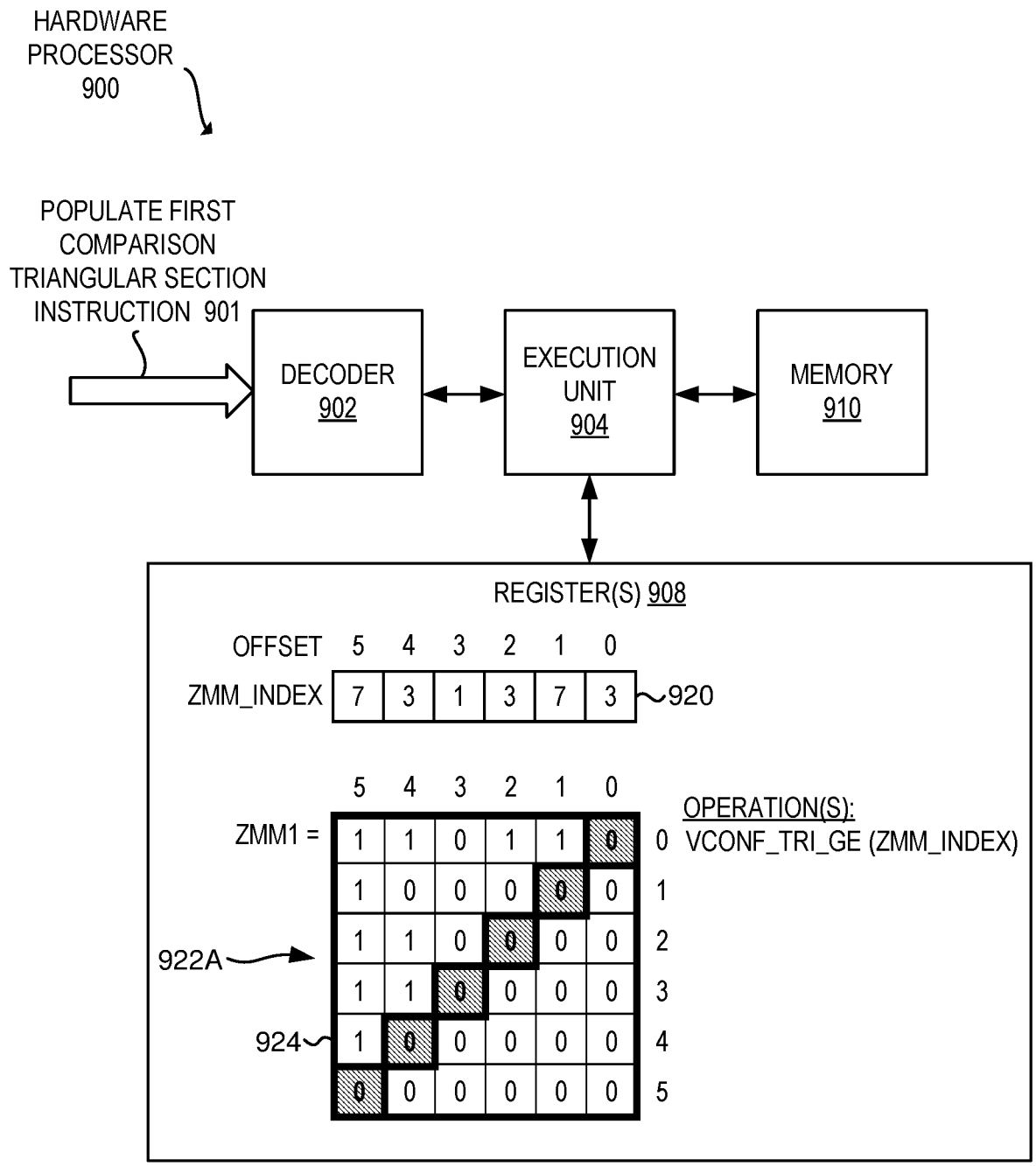
FIG. 9 illustrates a hardware processor to decode and execute a populate first comparison triangular section instruction according to embodiments of the disclosure.

FIG. 9 illustrates a hardware processor 900 to decode and execute a populate first comparison triangular section instruction 901 according to embodiments of the disclosure. Instruction 901 (e.g., single instruction) may be decoded (e.g., into micro-instructions and/or micro-operations) by decode unit 902 and the decoded instruction may be executed by the execution unit 904. Data may be accessed in register(s) 908 and/or memory 910. In certain embodiments, populate first comparison triangular section instruction 901 (e.g., VCONF_TRI_GE), when executed, is to cause (e.g., only) the upper triangular section 924 of comparison matrix 922A to be populated, e.g., from input operand of the input vector 920. In one embodiment, the type of operation to be performed is encoded in the opcode or in a field of the instruction (e.g., as an immediate). In the depicted embodiment, the elements of input vector 920 corresponding to storage of comparison values above the main diagonal (e.g., the upper triangular section 924) have a comparison operation performed, e.g., the GE in the opcode here indicating this is a greater than or equal to (GE) operation. In certain embodiments, this is enough information (e.g., comparisons) to handle possible duplicated. Referring to the comparison matrix 822 in FIG. 8, it is seen (and its true in the general case) that the comparison matrix (e.g., comparison matrix A) is anti-symmetrical with respect to the main diagonal, e.g., is in positions above the diagonal ($A[i][j]=1$) become 0s in symmetric position ($A[j][i]=0$). In this embodiment, only by the upper (e.g., or lower in another embodiment) triangular section the whole comparison matrix can be recovered. For example, a bitwise XOR operation and a matrix transpose operation (e.g., along the main diagonal) may be performed, e.g., on the upper triangular section. The population count operation over a comparison matrix may be split into two operations, e.g., ZMM_CONTROL=VPOPCNT(ZMM1_UPPER_TRIANGULAR_SECTION)+VPOPCNT(ZMM1_LOWER_ TRIANGULAR_SECTION). As the comparison matrix is antisymmetric (e.g., A[i][j], bitwise XOR(A[j][i])) computing 1s in columns of, e.g., lower triangular section, is the same as computing 0s in rows of upper triangular section, or the same as count is in rows of inverted upper triangular section.

In one embodiment, a (e.g., vector cross-lane) population count with exclusion instruction has the following format for its fields: VCPOPCNT{XOR,AND,OR,XNOR}{B,W,D,Q}{B,W,D,Q} destination{k1}, source one (src1), source two (src2), where {XOR,AND,OR,XNOR} indicates (e.g., in the opcode or as another field of the instruction) examples of the operation to be performed and the {B,W,D,Q} suffixes indicates two example sizes of source and destination elements, respectively, e.g., byte, word, doubleword, and quadword.

Pseudocode for the performance of this instruction may be as follows:
with (KL,VL)=for example, (64,512), (32,512), (16,512), (8,512) //where KL is the number of elements in the source/destination vector (e.g., from the second {B,W,D,Q} suffix) and VL is the vector length,
Op=operation (e.g., one of XOR,AND,OR,XNOR)
stride=size_of_source_suffix //stride=for example, 8,16,32, or 64 for first {B,W,D, or Q}
Nmax=VL/stride //Nmax=for example, 64, 32, 16, or 8 for first {B,W,D, or Q}
Operation:

```
for (i=0; i<KL; i++){   //loop over i-elements of the destination
    for (j=0, n=0; j<Nmax; j++){   //loop over j-elements of the
        sources
        if (src1[stride*j + i] Op src2[stride*j + i]) n++   //if bitwise
                                //Op of i-th bit in j-th element of src1
                                and src2 results in 1 then count it
    }
    if (k1[i])
        dest[i] = n   //store computed n value to i-th element of
                      the destination
}
```

In certain embodiments, there are two granularities present: (i) source granularity (stride), e.g., defined by the first suffix and (ii) destination granularity, e.g., defined by the second suffix. In one embodiment, the source granularity defines the stride by which going through the source operand happens and the destination granularity defines the size of the resulting elements. In certain embodiments, these might be independent.

In one embodiment, this may be described as: take a bit position as i-th bit in j-th element in source granularity (stride*j+i); take a first bit from the bit position in the first source operand (src1[stride*j+i]) and a second bit from the bit position in the second source operand (src2[stride*j+i]). Compute logical operation (e.g., defined in the opcode of the instruction) over the first and the second bits. If the result is "1" then increment counter. Repeat for all elements from the first source operand (j=0 . . . Nmax−1) and fixed i-th position. Store the final counter result in i-th element of the destination operand, for example, as a packed element in a vector register.

In another embodiment of a population count with exclusion instruction, the source granularity comes in as an immediate operand. In this case only one (destination) granularity may be in an opcode. An embodiment of an instruction with exclusion has the following format for its fields: VCPOPCNT{XOR,AND,OR,XNOR}{B,W,D,Q} dest{k1}, src1, src2, imm8 or src3, where {XOR,AND,OR,XNOR} indicates (e.g., in the opcode or as another field of the instruction) examples of the operation to be performed and the {B,W,D,Q} suffix indicate example sizes of destination elements, e.g., byte, word, doubleword, and quadword. Pseudocode for the performance of this instruction may be as follows:
where (KL,VL)=for example, (64,512) (32,512) (16,512) (8,512) //where KL is the number of elements in the destination vector (e.g., from the {B,W,D,Q} suffix) and VL is the vector length,
Op=one of (XOR, AND, OR, XNOR), e.g., pairwise logical operation from opcode,
stride=imm8 or src3 //stride=for example, 0 to 255 bits,
Nmax=VL/stride //Nmax=for example, 64, 32, 16, or 8 for the {B,W,D,Q} suffix
Operation:

```
for (i=0; i<KL; i++){   //loop over i-elements of the destination
    for (j=0, n=0; j<Nmax; j++){   //loop over j-elements of the source
        if (src1[stride*j + i] Op src2[stride*j + i]) n++   //if bitwise
                                //Op of i-th bit in j-th element of src1
                                and src2 results in 1 then count it
    }
    if (k1[i])
        dest[i] = n   //store computed n value to i-th element of the
                      destination
}
```

In another embodiment, a population count with exclusion instruction is without an embedded logical operation. An embodiment of a population count with exclusion instruction has the following format for its fields: VCPOPCNT{B,W,D,Q}{B,W,D,Q} dest{k1}, src, where the {B,W,D,Q} suffixes indicate two example sizes of source and destination elements, respectively, e.g., byte, word, doubleword, and quadword.

Pseudocode for the performance of this instruction may be as follows:
(KL,VL)=for example, (64,512) (32,512) (16,512) (8,512) // where KL is the number of elements in the source/destination vector (e.g., from the second {B,W,D,Q} suffix) and VL is the vector length,
stride=size_of_source_suffix // stride=for example, 8, 16, 32, or 64 for first {B,W,D, or Q}
Nmax=VL/stride //Nmax=for example, 64, 32, 16, 8 for first {B,W,D, or Q}
Operation:

```
for (i=0; i<KL; i++){   //loop over i-elements of the destination
    for (j=0, n=0; j<Nmax; j++){   //loop over j-elements of the source
        if (src[stride*j + i]) n++   //if i-th bit in j-th element of the
                                //source is 1 then count it
    }
    if (k1[i])
        dest[i] = n  //store computed value to i-th element of
                     the destination
}
```

In yet another embodiment, applying one or more operations herein computes the number of elements in a vector which have a certain attribute. For example, if a certain attribute is a certain bit position in the packed elements and its value is ether "1" if the element has this attribute or "0" if it does not, then an instruction (e.g., VCPOPCNT) is to compute the number of elements having certain attribute for each attribute. For example, see the discussion of FIG. 13 below.

Note that although first and second are used for reference to instruction 901 and instruction 1101, they are not required to be scheduled or executed in that order in certain embodiments.

In certain embodiments, counting is in columns of the lower triangular section is the same as counting 0s in rows of the upper triangular section. For example, if a comparison matrix (e.g., ZMM1) includes only the results of a single comparison triangular section instruction, e.g., and the remainder of the comparison matrix being zeroes, then the second part of the control vector (e.g., ZMM_CONTROL) (e.g., corresponding to computing a lower triangular section) may be computed as 0s in rows of (e.g., the upper triangular section of) ZMM1 or is in rows if values are inverted via XOR operation. In certain embodiments with a pre-defined thermometer constant matrix used for inversion, lower triangular section's zeroes are left unchanged. Thermometer constant (e.g., matrix) may be used as an exclusion mask, e.g., to extend counting is to the whole ZMM1 but effectively excluding the lower triangular section from computations. Additionally or alternatively, thermometer constant (e.g., matrix) may be used as a second operand for inverting values of an (e.g., upper) triangular section of ZMM1, e.g., by XOR operation. In certain embodiments, the completed (e.g., full) control vector (e.g., ZMM_CONTROL)= VPOPCNT(ZMM1)+VCPOPCNTXOR(ZMM1,ZMM_THERMOMETER).

Figure 10:
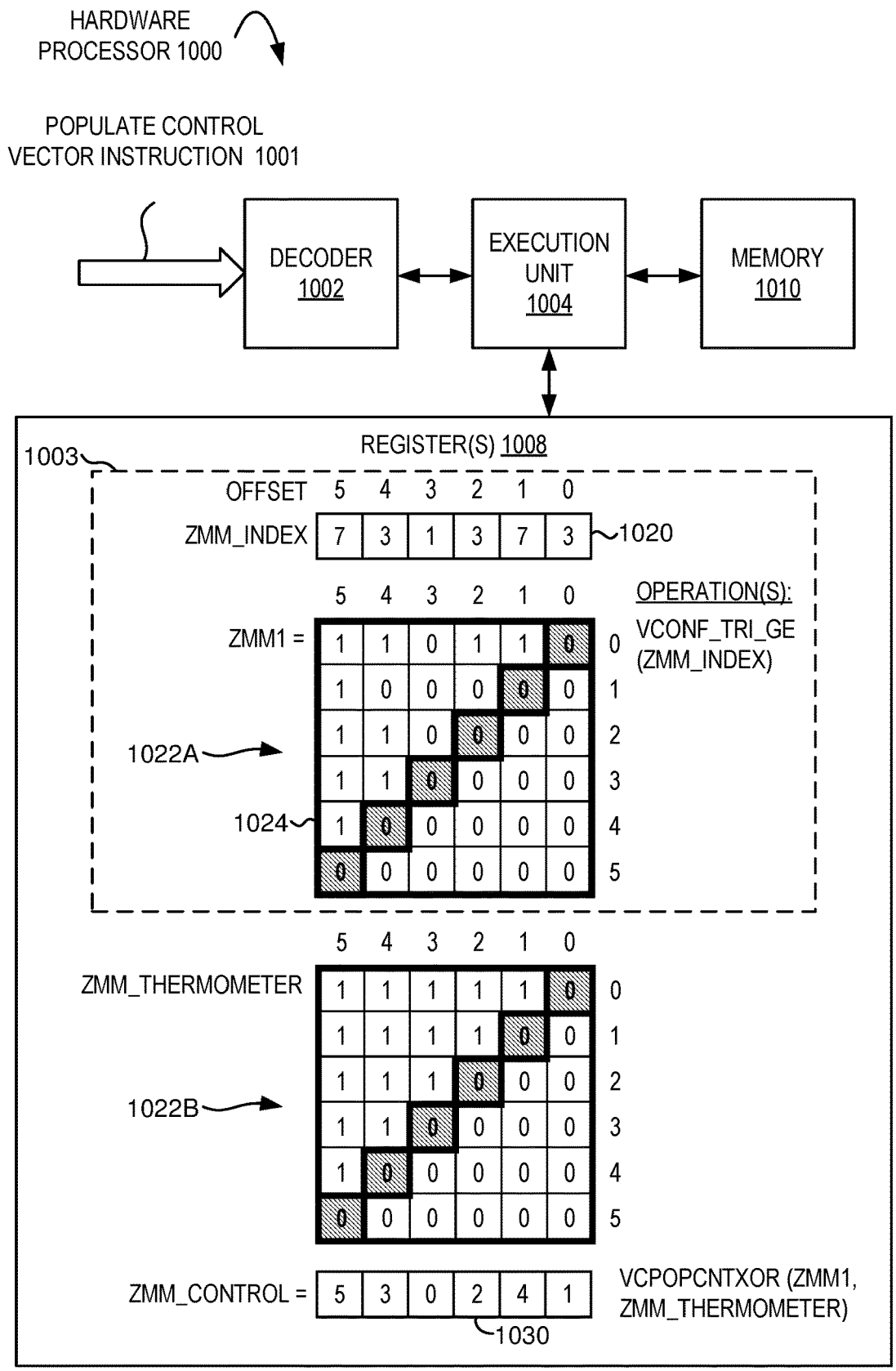
FIG. 10 illustrates a hardware processor to decode and execute a populate control vector instruction according to embodiments of the disclosure.

FIG. 10 illustrates a hardware processor to decode and execute a populate control vector instruction 1000 according to embodiments of the disclosure. Instruction 1001 (e.g., single instruction) may be decoded (e.g., into micro-instructions and/or micro-operations) by decode unit 1002 and the decoded instruction may be executed by the execution unit 1004. Data may be accessed in register(s) 1008 and/or memory 1010 (e.g., thermometer constant matrix 1022B may be stored in either or both). In certain embodiments, populate control vector instruction 1001 (e.g., VPOPCNTXOR), when executed, is to cause the control vector 1030 to be populated, e.g., from input operands of the input vector 1020 (e.g., upper triangular section 1024) and the thermometer constant matrix 1022B. In certain embodiments, the second comparison triangular section (e.g., or the entire comparison matrix) is not populated, for example, the control matrix (e.g., ZMM_CONTROL) is computed without this intermediate step. In one embodiment, a first operation (e.g., the VPOPCNT instruction) counts is in columns (e.g., it may be extended to the whole comparison matrix (e.g., ZMM1) as lower triangular section is filled with zeroes) and a second operation (e.g., VCPOPCNTXOR instructions) counts is in rows of inverted comparison matrix (e.g., ZMM1) XORed with ZMM_THERMOMETER (bitwise ZMM1 XOR ZMM_THERMOMETER). In one embodiment, if the execution unit were to simply count 0s, then the computation is not extended to the whole matrix (e.g., ZMM1) because lower triangular section has 0s, e.g., and instead the exclusion mask (thermometer constant matrix) is to be used in this embodiment.

In one embodiment in FIG. 10, the control vector 1030 results from:
VCPOPCNTXOR(ZMM1, ZMM_THERM)=(0 0 0 1 3 1)
VPOPCNT(ZMM1)=(5 3 0 1 1 0), and thus adding these two vectors results in:
ZMM_CONTROL=(5 3 0 2 4 1).

In another embodiment in FIG. 10, the control vector 1030 results from the sum of two parts of ZMM_CONTROLS:
ZMM_VERT=VPOPCNT(ZMM1)
ZMM_HORIZ=VCPOPCNTXOR(ZMM1,ZMM_THERM), and thus:
ZMM_CONTROL=ZMM_VERT+ZMM_HORIZ In certain embodiments, one or more of the other operations 1003 may be performed by execution of another instruction or instruction sequence, e.g., by instruction 901 in FIG. 9, and the (e.g., output) data available to instruction 1001. Alternatively, in certain embodiments the other operations 1003 are performed by execution of instruction 1001. Similar components, operations, etc. in different figures may be referred to with similar reference. Control vector 1030 may then be used to populate (e.g., sort) a value output vector, e.g., according to how the value output vector 733 is populated.

Figure 11:
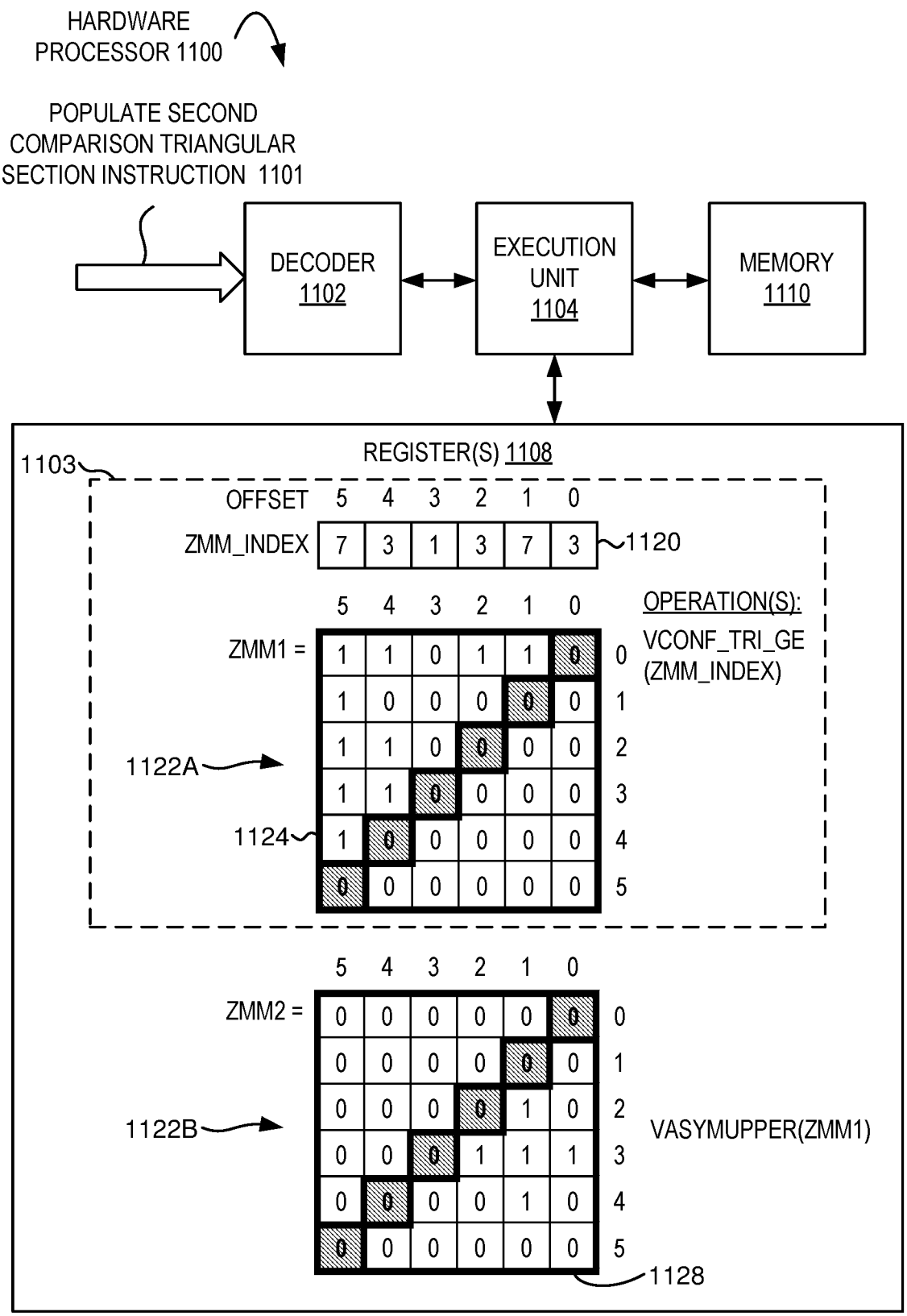
FIG. 11 illustrates a hardware processor to decode and execute a populate second comparison triangular section instruction according to embodiments of the disclosure.

FIG. 11 illustrates a hardware processor 1100 to decode and execute a populate second comparison triangular section instruction 1101 according to embodiments of the disclosure. Instruction 1101 (e.g., single instruction) may be decoded (e.g., into micro-instructions and/or micro-operations) by decode unit 1102 and the decoded instruction may be executed by the execution unit 1104. Data may be accessed in register(s) 1108 and/or memory 1110. In certain embodiments, populate second comparison triangular section instruction 1101 (e.g., VASYMUPPER), when executed, is to cause the lower triangular section 1128 of comparison matrix 1122B to be populated, e.g., from the input operand of the input vector 1120 (e.g., upper triangular section 1124). In one embodiment, the lower triangular section 1128 of comparison matrix 1122B is to be populated from the input operand of the upper triangular section 1124, for example, without performing a comparison operation, e.g., by performing a logical operation. One embodiment of a logical operation is to perform an anti-symmetric operation on the upper triangular section, e.g., without the use of a thermometer constant matrix.

Another example of a sorting sequence for an input vector with duplicates is the following operations:
(1) ZMM1=VCONF_TRI_GE(ZMM_INDEX)
(2) ZMM2=VASYMUPPER(ZMM1)
(3) ZMM_CONTROL=VPOPCNT(ZMM1+ZMM2)
(4) ZMM_RES=VPUSH_PERM (ZMM_INDEX, ZMM_CONTROL)

In certain embodiments, one or more of the other operations 1103 may be performed by execution of another instruction or instruction sequence, e.g., by instruction 901 in FIG. 9, and the (e.g., output) data available to instruction 1101. Alternatively, in certain embodiments the other operations 1103 are performed by execution of instruction 1101. Similar components, operations, etc. in different figures may be referred to with similar reference numbers.

Figure 12:
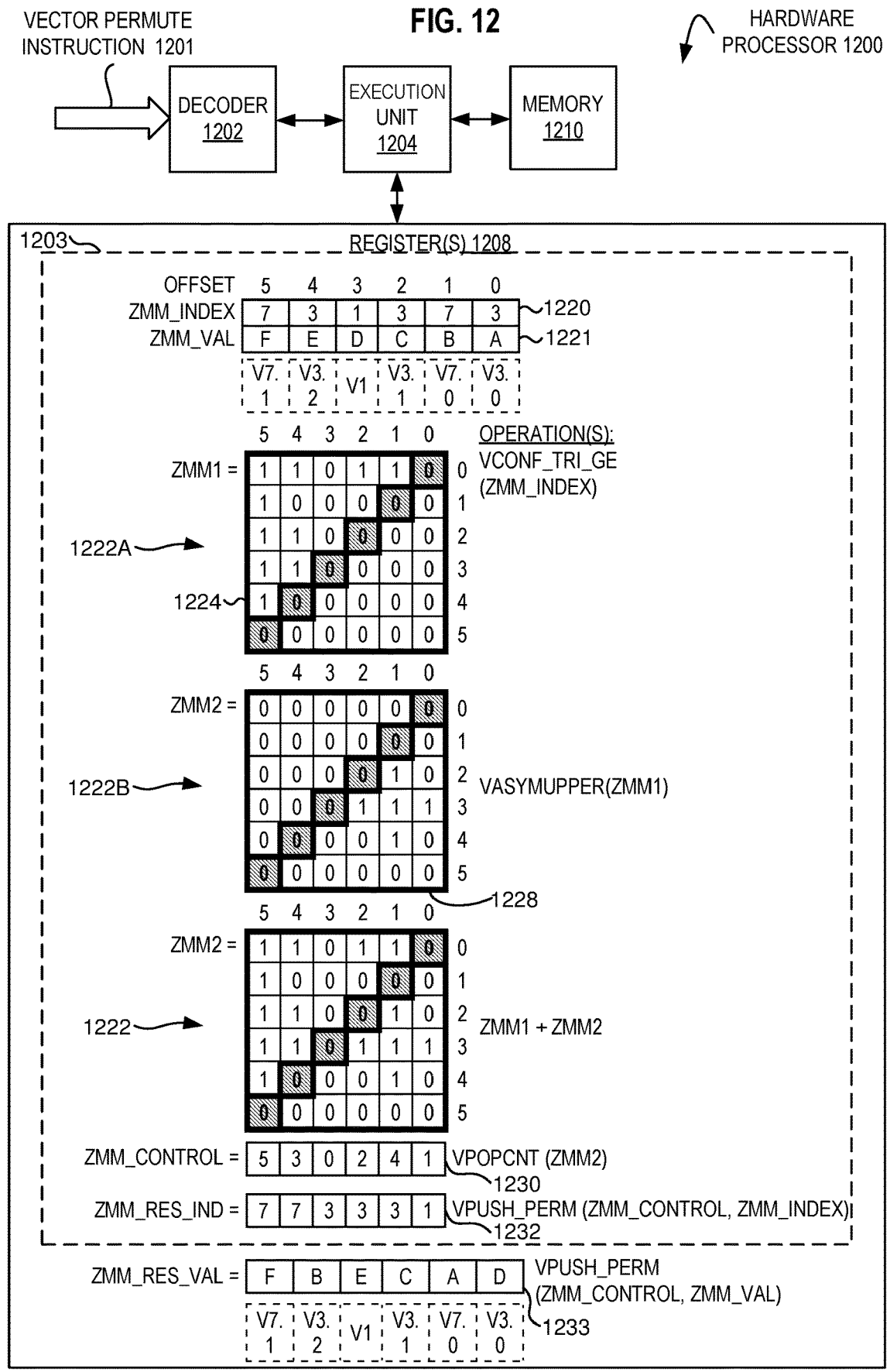
FIG. 12 illustrates a hardware processor to decode and execute a vector permute instruction according to embodiments of the disclosure.

FIG. 12 illustrates a hardware processor 1200 to decode and execute a vector permute instruction 1201 according to embodiments of the disclosure. Instruction 1201 (e.g., single instruction) may be decoded (e.g., into micro-instructions and/or micro-operations) by decode unit 1202 and the decoded instruction may be executed by the execution unit 1204. Data may be accessed in register(s) 1208 and/or memory 1210. In certain embodiments, vector permute instruction 1201 (e.g., VPUSH_PERM), when executed, is to cause the output of (e.g., numerically sorted) value output vector 1233 from the control vector 1230, e.g., from input operands of the control vector 1230 and the value input vector 1221. In certain embodiments, each element of value input vector 1221 is associated (e.g., mapped) to the index values in the (e.g., index) input vector 1220. In a sorting embodiment, input vector 1220 (e.g., ZMM_INDEX) is the key (by which structures are sorted) and the value input vector 1221 (e.g., ZMM_VAL) stores the values (which are sorted by the key). Certain embodiments herein thus provide for sorting of key and value data structures by using comparisons of the keys. For example, instruction 1201 may place each element of value input vector 1221 into an element position in value output vector 1233 according to the offset value in the control vector 1230, e.g., the second from the right element (offset 1) of control vector 1230 is a four which indicates to the execution unit 1204 to place an associated value of "B" of the value input vector 1221 (offset 1 in value input vector 1221) in the value output vector 1233 in the offset 4 place. The letter B, and the other letters, are examples of variables representing what a value may be. A value may be any value, e.g., a number or string of numbers. In the depicted embodiment, after permutation instruction 1201 is executed (e.g., committed), ZMM_RES_IND=7,7, 3,3,3,1 and ZMM_RES_VAL=F,B,E,C,A,D. Thus certain embodiments here provide for the order of corresponding, indexed values are preserved, e.g., for the indices (e.g., keys) equal to 3 here, the permuted order of values output is E,C,A, and not ACE or EAC. This may be generally referred to as stable sorting, e.g., the relative order of records with equal keys is maintained. In certain embodiments, vector permute instruction 1201, when executed, is to cause the upper triangular section 1224 and lower triangular section 1228 of comparison matrix 1222 to be populated, e.g., from input operands of the partial (e.g., upper triangular section) comparison matrix 1222A and the partial (e.g., lower triangular section) comparison matrix 1222B. In one embodiment, this may be matrix addition (e.g., with masks on the non-used parts of the input matrix or matrices). In certain embodiments, one or more of the other operations 1203 may be performed by execution of another instruction or instruction sequence, e.g., by instruction 901 in FIG. 9 and/or instruction 1101 in FIG. 11, and the (e.g., output) data available to instruction 1201. Alternatively, in certain embodiments the other operations 1203 are performed by execution of instruction 1201. Similar components, operations, etc. in different figures may be referred to with similar reference numbers.

Figure 13:
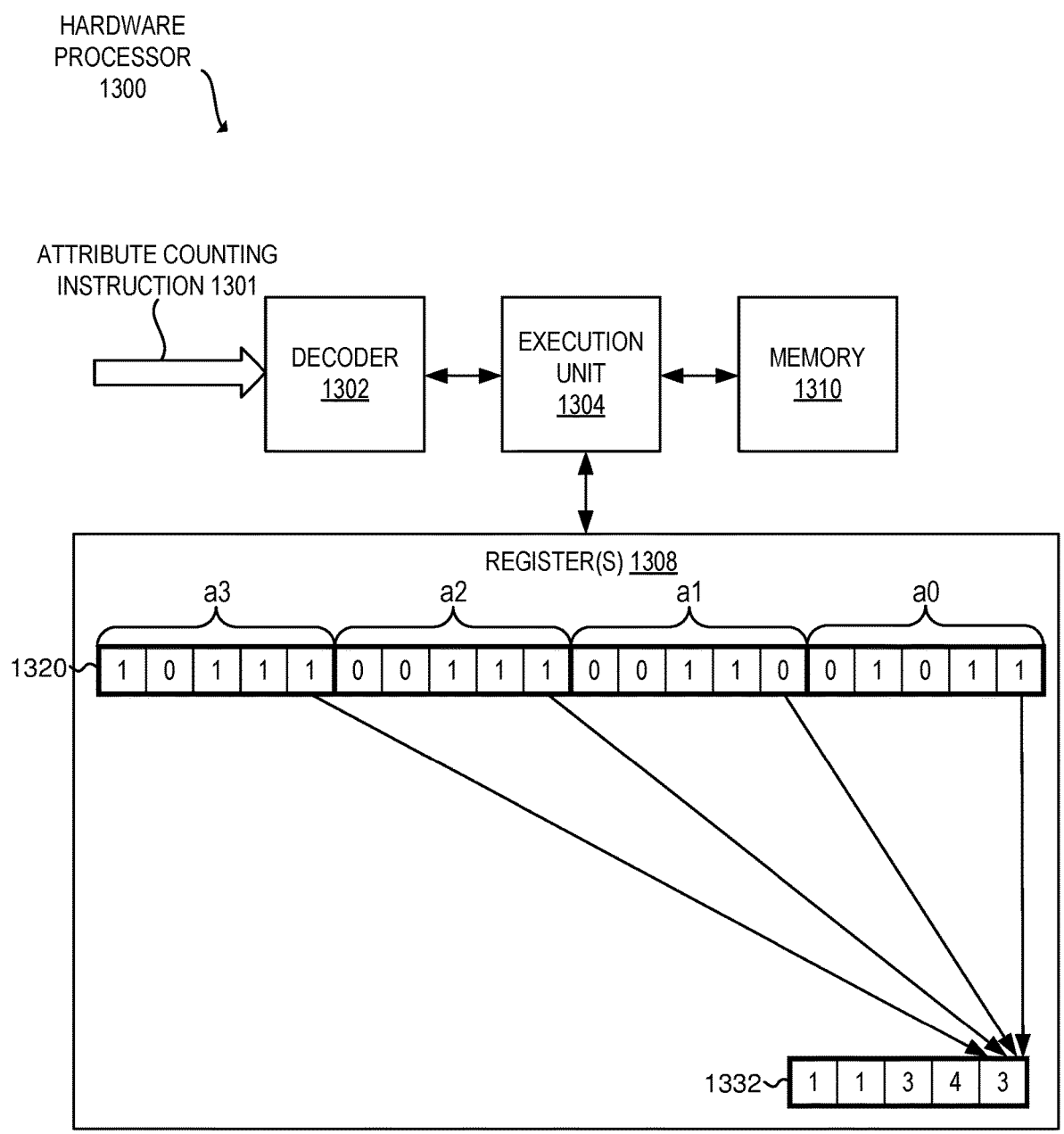
FIG. 13 illustrates a hardware processor to decode and execute an attribute counting instruction according to embodiments of the disclosure.

FIG. 13 illustrates a hardware processor 1300 to decode and execute an attribute counting instruction 1301 according to embodiments of the disclosure. For example, if a certain attribute is a certain bit position in the packed elements (e.g., each of sections a0-a3) and its value is ether "1" if the element has this attribute or "0" if it does not, then an instruction (e.g., VCPOPCNT) is to compute the number of elements having certain attribute for each attribute, for example, stored into output vector 1332. For example, the right most element of vector 1332 includes a three, which indicates that 3 of the four sections (a0-a4, which may be vectors) include the value 3 in their right most element. Similarly for the other corresponding bit positions in the other sections.

FIG. 14 illustrates a flow diagram 1400 according to embodiments of the disclosure. Depicted flow 1400 includes decoding an instruction with a decoder of a processor into a decoded instruction 1402; and executing the decoded instruction with an execution unit of the processor to: provide storage for a comparison matrix to store a comparison value for each element of an input vector compared against the other elements of the input vector, perform a comparison operation on elements of the input vector corresponding to storage of comparison values above a main diagonal of the comparison matrix, perform a different operation on elements of the input vector corresponding to storage of comparison values below the main diagonal of the comparison matrix, and store results of the comparison operation and the different operation in the comparison matrix 1404.

In one embodiment, a processor includes a decoder to decode an instruction into a decoded instruction; and an execution unit to execute the decoded instruction to: provide storage for a comparison matrix to store a comparison value for each element of an input vector compared against the other elements of the input vector, perform a comparison operation on elements of the input vector corresponding to storage of comparison values above a main diagonal of the comparison matrix, perform a different operation on elements of the input vector corresponding to storage of comparison values below the main diagonal of the comparison matrix, and store results of the comparison operation and the different operation in the comparison matrix. The different operation may be a different comparison operation than the comparison operation. The comparison operation may be one of a greater than or equal to operation and a greater than operation, and the different comparison operation is the other. The different operation may be an anti-symmetrical operation to be performed on the elements of the input vector corresponding to storage of comparison values above the main diagonal of the comparison matrix. The anti-symmetrical operation may invert a comparison value into an inverted comparison value for each of the elements of the input vector corresponding to storage of comparison values above the main diagonal of the comparison matrix and store the inverted comparison value for an operation performed on a position (x, y) into a position (y, x) in the comparison matrix. The decoder may decode a second instruction into a second decoded instruction, and the execution unit may execute the second decoded instruction to add each row (or column) of results for or in the comparison matrix to generate a control vector. The decoder may decode a third instruction into a third decoded instruction, and the execution unit may execute the third decoded instruction to move the elements of the input vector according to the control vector to output a numerically sorted output vector. The input vector may include a set of duplicate elements and the numerically sorted output vector includes each element of the set of duplicate elements.

In another embodiment, a method includes decoding an instruction with a decoder of a processor into a decoded instruction; and executing the decoded instruction with an execution unit of the processor to: provide storage for a comparison matrix to store a comparison value for each element of an input vector compared against the other elements of the input vector, perform a comparison operation on elements of the input vector corresponding to storage of comparison values above a main diagonal of the comparison matrix, perform a different operation on elements of the input vector corresponding to storage of comparison values below the main diagonal of the comparison matrix, and store results of the comparison operation and the different operation in the comparison matrix. The different operation may be a different comparison operation than the comparison operation. The comparison operation may be one of a greater than or equal to operation and a greater than operation, and the different comparison operation is the other. The different operation may be an anti-symmetrical operation to be performed on the elements of the input vector corresponding to storage of comparison values above the main diagonal of the comparison matrix. The anti-symmetrical operation may invert a comparison value into an inverted comparison value for each of the elements of the input vector corresponding to storage of comparison values above the main diagonal of the comparison matrix and store the inverted comparison value for an operation performed on a position (x, y) into a position (y, x) in the comparison matrix. The method may include decoding a second instruction with the decoder into a second decoded instruction; and executing the second decoded instruction with the execution unit to add each row (or column) of results for or in the comparison matrix to generate a control vector. The method may further include decoding a third instruction with the decoder into a third decoded instruction; and executing the third decoded instruction with the execution unit to move the elements of the input vector according to the control vector to output a numerically sorted output vector. The input vector may include a set of duplicate elements and the numerically sorted output vector includes each element of the set of duplicate elements.

In yet another embodiment, a non-transitory machine readable medium that stores code that when executed by a machine causes the machine to perform a method including: decoding an instruction with a decoder of a processor into a decoded instruction; and executing the decoded instruction with an execution unit of the processor to: provide storage for a comparison matrix to store a comparison value for each element of an input vector compared against the other elements of the input vector, perform a comparison operation on elements of the input vector corresponding to storage of comparison values above a main diagonal of the comparison matrix, perform a different operation on elements of the input vector corresponding to storage of comparison values below the main diagonal of the comparison matrix, and store results of the comparison operation and the different operation in the comparison matrix. The different operation may be a different comparison operation than the comparison operation. The comparison operation may be one of a greater than or equal to operation and a greater than operation, and the different comparison operation is the other. The different operation may be an anti-symmetrical operation to be performed on the elements of the input vector corresponding to storage of comparison values above the main diagonal of the comparison matrix. The anti-symmetrical operation may invert a comparison value into an inverted comparison value for each of the elements of the input vector corresponding to storage of comparison values above the main diagonal of the comparison matrix and store the inverted comparison value for an operation performed on a position (x, y) into a position (y, x) in the comparison matrix. The method may include decoding a second instruction with the decoder into a second decoded instruction; and executing the second decoded instruction with the execution unit to add each row (or column) of results for or in the comparison matrix to generate a control vector. The method may further include decoding a third instruction with the decoder into a third decoded instruction; and executing the third decoded instruction with the execution unit to move the elements of the input vector according to the control vector to output a numerically sorted output vector. The input vector may include a set of duplicate elements and the numerically sorted output vector includes each element of the set of duplicate elements.

In another embodiment, a processor includes means to decode an instruction into a decoded instruction; and means to execute the decoded instruction to: provide storage for a comparison matrix to store a comparison value for each element of an input vector compared against the other elements of the input vector, perform a comparison operation on elements of the input vector corresponding to storage of comparison values above a main diagonal of the comparison matrix, perform a different operation on elements of the input vector corresponding to storage of comparison values below the main diagonal of the comparison matrix, and store results of the comparison operation and the different operation in the comparison matrix.

In yet another embodiment, an apparatus comprises a data storage device that stores code that when executed by a hardware processor causes the hardware processor to perform any method disclosed herein. An apparatus may be as described in the detailed description. A method may be as described in the detailed description.

In another embodiment, a non-transitory machine readable medium that stores code that when executed by a machine causes the machine to perform a method comprising any method disclosed herein.

Certain embodiments herein provide an instruction with different comparison operations for comparison to the right and to the left, for example, which may be used (e.g., by a compiler or binary translator) to auto-vectorize patterns of sorting a number of elements. The elements may reside in a vector register. In certain embodiments, the same number of instructions (e.g., operations or comparisons) occur for cases with duplicate entries and without duplicate entries. Certain embodiments herein improve performance of applications having sorting patterns with duplicates. Certain embodiments herein provide for a single instruction or sequence of instructions that correctly handles numerically sorting of vectors with and without duplicate entries therein.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, April 2016; and see Intel® Architecture Instruction Set Extensions Programming Reference, February 2016).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 15A:
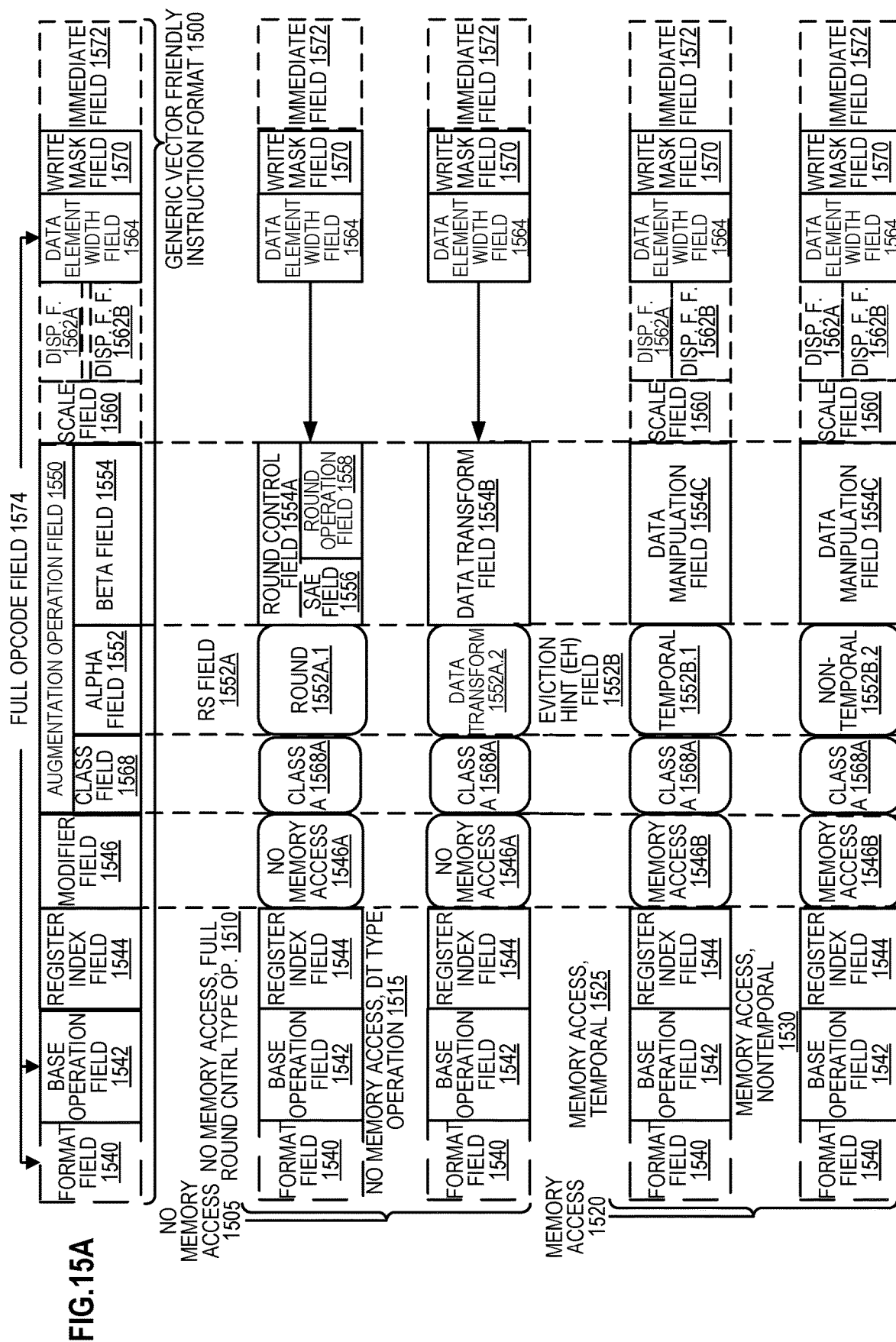
FIG. 15A is a block diagram illustrating a generic vector friendly instruction format and class A instruction templates thereof according to embodiments of the disclosure.
Figure 15B:
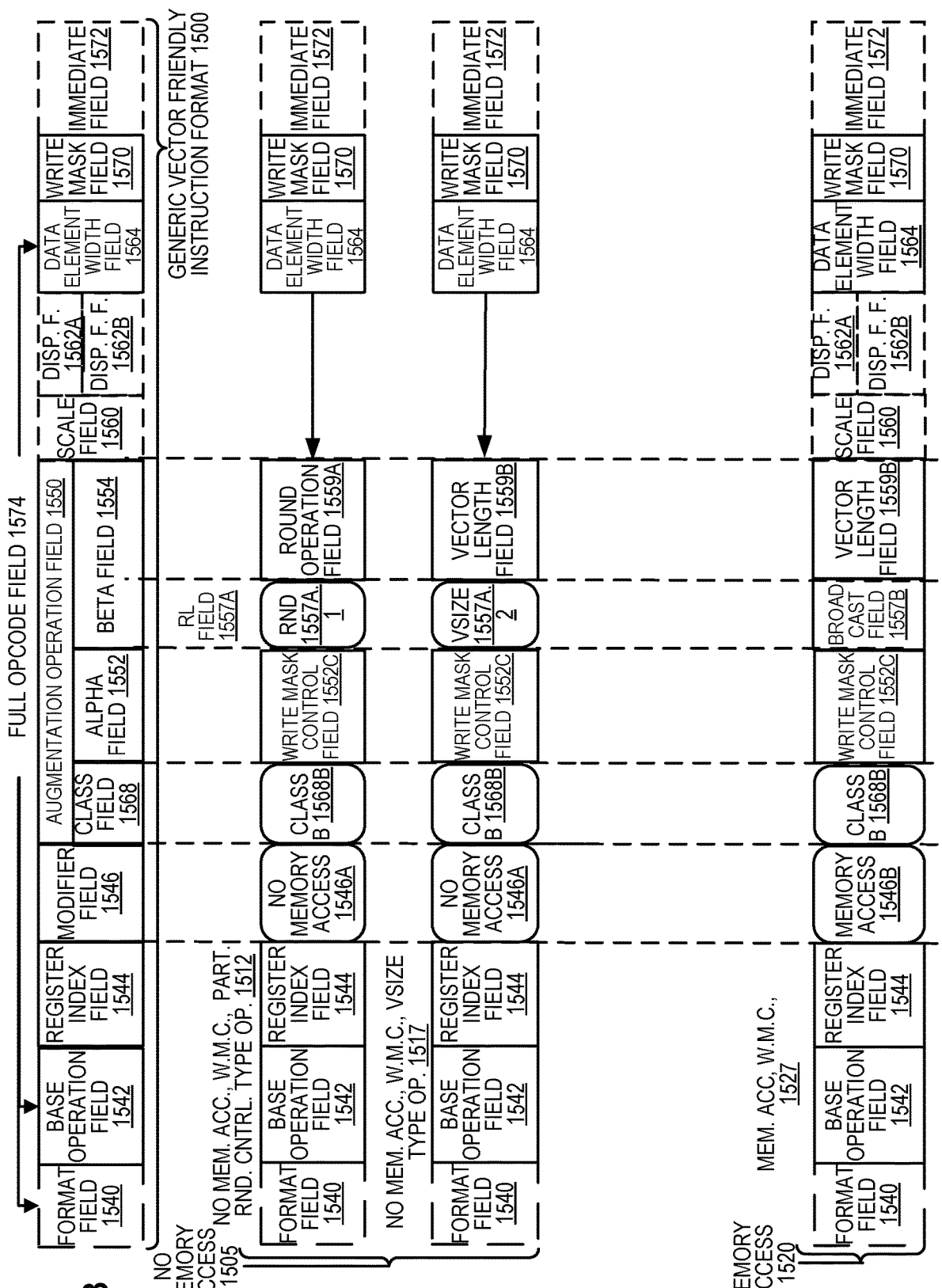
FIG. 15B is a block diagram illustrating the generic vector friendly instruction format and class B instruction templates thereof according to embodiments of the disclosure.

FIGS. 15A-15B are block diagrams illustrating a generic vector friendly instruction format and instruction templates thereof according to embodiments of the disclosure. FIG. 15A is a block diagram illustrating a generic vector friendly instruction format and class A instruction templates thereof according to embodiments of the disclosure; while FIG. 15B is a block diagram illustrating the generic vector friendly instruction format and class B instruction templates thereof according to embodiments of the disclosure. Specifically, a generic vector friendly instruction format 1500 for which are defined class A and class B instruction templates, both of which include no memory access 1505 instruction templates and memory access 1520 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 15A include: 1) within the no memory access 1505 instruction templates there is shown a no memory access, full round control type operation 1510 instruction template and a no memory access, data transform type operation 1515 instruction template; and 2) within the memory access 1520 instruction templates there is shown a memory access, temporal 1525 instruction template and a memory access, non-temporal 1530 instruction template. The class B instruction templates in FIG. 15B include: 1) within the no memory access 1505 instruction templates there is shown a no memory access, write mask control, partial round control type operation 1512 instruction template and a no memory access, write mask control, vsize type operation 1517 instruction template; and 2) within the memory access 1520 instruction templates there is shown a memory access, write mask control 1527 instruction template.

The generic vector friendly instruction format 1500 includes the following fields listed below in the order illustrated in FIGS. 15A-15B.

Format field 1540—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1542—its content distinguishes different base operations.

Register index field 1544—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1546—its content distinguishes occurrences of instructions in the generic vector instruction format that specify memory access from those that do not; that is, between no memory access 1505 instruction templates and memory access 1520 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1550—its content distinguishes which one of a variety of different operations to be performed in addition to the base operation. This field is context specific. In one embodiment of the disclosure, this field is divided into a class field 1568, an alpha field 1552, and a beta field 1554. The augmentation operation field 1550 allows common groups of operations to be performed in a single instruction rather than 2, 3, or 4 instructions.

Scale field 1560—its content allows for the scaling of the index field's content for memory address generation (e.g., for address generation that uses $2^{scale}*$index+base).

Displacement Field 1562A—its content is used as part of memory address generation (e.g., for address generation that uses $2^{scale}*$index+base+displacement).

Displacement Factor Field 1562B (note that the juxtaposition of displacement field 1562A directly over displacement factor field 1562B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1574 (described later herein) and the data manipulation field 1554C. The displacement field 1562A and the displacement factor field 1562B are optional in the sense that they are not used for the no memory access 1505 instruction templates and/or different embodiments may implement only one or none of the two.

Data element width field 1564—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1570—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1570 allows for partial vector operations, including loads, stores, arithmetic, logical, etc. While embodiments of the disclosure are described in which the write mask field's 1570 content selects one of a number of write mask registers that contains the write mask to be used (and thus the write mask field's 1570 content indirectly identifies that masking to be performed), alternative embodiments instead or additional allow the mask write field's 1570 content to directly specify the masking to be performed.

Immediate field 1572—its content allows for the specification of an immediate. This field is optional in the sense that is it not present in an implementation of the generic vector friendly format that does not support immediate and it is not present in instructions that do not use an immediate.

Class field 1568—its content distinguishes between different classes of instructions. With reference to FIGS. 15A-B, the contents of this field select between class A and class B instructions. In FIGS. 15A-B, rounded corner squares are used to indicate a specific value is present in a field (e.g., class A 1568A and class B 1568B for the class field 1568 respectively in FIGS. 15A-B).

Instruction Templates of Class A

In the case of the non-memory access 1505 instruction templates of class A, the alpha field 1552 is interpreted as an RS field 1552A, whose content distinguishes which one of the different augmentation operation types are to be performed (e.g., round 1552A.1 and data transform 1552A.2 are respectively specified for the no memory access, round type operation 1510 and the no memory access, data transform type operation 1515 instruction templates), while the beta field 1554 distinguishes which of the operations of the specified type is to be performed. In the no memory access 1505 instruction templates, the scale field 1560, the displacement field 1562A, and the displacement scale filed 1562B are not present.

No-Memory Access Instruction Templates—Full Round Control Type Operation

In the no memory access full round control type operation 1510 instruction template, the beta field 1554 is interpreted as a round control field 1554A, whose content(s) provide static rounding. While in the described embodiments of the disclosure the round control field 1554A includes a suppress all floating point exceptions (SAE) field 1556 and a round operation control field 1558, alternative embodiments may support may encode both these concepts into the same field or only have one or the other of these concepts/fields (e.g., may have only the round operation control field 1558).

SAE field 1556—its content distinguishes whether or not to disable the exception event reporting; when the SAE field's 1556 content indicates suppression is enabled, a given instruction does not report any kind of floating-point exception flag and does not raise any floating point exception handler.

Round operation control field 1558—its content distinguishes which one of a group of rounding operations to perform (e.g., Round-up, Round-down, Round-towards-zero and Round-to-nearest). Thus, the round operation control field 1558 allows for the changing of the rounding mode on a per instruction basis. In one embodiment of the disclosure where a processor includes a control register for specifying rounding modes, the round operation control field's 1550 content overrides that register value.

No Memory Access Instruction Templates—Data Transform Type Operation

In the no memory access data transform type operation 1515 instruction template, the beta field 1554 is interpreted as a data transform field 1554B, whose content distinguishes which one of a number of data transforms is to be performed (e.g., no data transform, swizzle, broadcast).

In the case of a memory access 1520 instruction template of class A, the alpha field 1552 is interpreted as an eviction hint field 1552B, whose content distinguishes which one of the eviction hints is to be used (in FIG. 15A, temporal 1552B.1 and non-temporal 1552B.2 are respectively specified for the memory access, temporal 1525 instruction template and the memory access, non-temporal 1530 instruction template), while the beta field 1554 is interpreted as a data manipulation field 1554C, whose content distinguishes which one of a number of data manipulation operations (also known as primitives) is to be performed (e.g., no manipulation; broadcast; up conversion of a source; and down conversion of a destination). The memory access 1520 instruction templates include the scale field 1560, and optionally the displacement field 1562A or the displacement scale field 1562B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1552 is interpreted as a write mask control (Z) field 1552C, whose content distinguishes whether the write masking controlled by the write mask field 1570 should be a merging or a zeroing.

In the case of the non-memory access 1505 instruction templates of class B, part of the beta field 1554 is interpreted as an RL field 1557A, whose content distinguishes which one of the different augmentation operation types are to be performed (e.g., round 1557A.1 and vector length (VSIZE) 1557A.2 are respectively specified for the no memory access, write mask control, partial round control type operation 1512 instruction template and the no memory access, write mask control, VSIZE type operation 1517 instruction template), while the rest of the beta field 1554 distinguishes which of the operations of the specified type is to be performed. In the no memory access 1505 instruction templates, the scale field 1560, the displacement field 1562A, and the displacement scale filed 1562B are not present.

In the no memory access, write mask control, partial round control type operation 1510 instruction template, the rest of the beta field 1554 is interpreted as a round operation field 1559A and exception event reporting is disabled (a given instruction does not report any kind of floating-point exception flag and does not raise any floating point exception handler).

Round operation control field 1559A—just as round operation control field 1558, its content distinguishes which one of a group of rounding operations to perform (e.g., Round-up, Round-down, Round-towards-zero and Round-to-nearest). Thus, the round operation control field 1559A allows for the changing of the rounding mode on a per instruction basis. In one embodiment of the disclosure where a processor includes a control register for specifying rounding modes, the round operation control field's 1550 content overrides that register value.

In the no memory access, write mask control, VSIZE type operation 1517 instruction template, the rest of the beta field 1554 is interpreted as a vector length field 1559B, whose content distinguishes which one of a number of data vector lengths is to be performed on (e.g., 128, 256, or 512 byte).

In the case of a memory access 1520 instruction template of class B, part of the beta field 1554 is interpreted as a broadcast field 1557B, whose content distinguishes whether or not the broadcast type data manipulation operation is to be performed, while the rest of the beta field 1554 is interpreted the vector length field 1559B. The memory access 1520 instruction templates include the scale field 1560, and optionally the displacement field 1562A or the displacement scale field 1562B.

With regard to the generic vector friendly instruction format 1500, a full opcode field 1574 is shown including the format field 1540, the base operation field 1542, and the data element width field 1564. While one embodiment is shown where the full opcode field 1574 includes all of these fields, the full opcode field 1574 includes less than all of these fields in embodiments that do not support all of them. The full opcode field 1574 provides the operation code (opcode).

The augmentation operation field 1550, the data element width field 1564, and the write mask field 1570 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 16 is a block diagram illustrating an exemplary specific vector friendly instruction format according to embodiments of the disclosure. FIG. 16 shows a specific vector friendly instruction format 1600 that is specific in the sense that it specifies the location, size, interpretation, and order of the fields, as well as values for some of those fields. The specific vector friendly instruction format 1600 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 15 into which the fields from FIG. 16 map are illustrated.

It should be understood that, although embodiments of the disclosure are described with reference to the specific vector friendly instruction format 1600 in the context of the generic vector friendly instruction format 1500 for illustrative purposes, the disclosure is not limited to the specific vector friendly instruction format 1600 except where claimed. For example, the generic vector friendly instruction format 1500 contemplates a variety of possible sizes for the various fields, while the specific vector friendly instruction format 1600 is shown as having fields of specific sizes. By way of specific example, while the data element width field 1564 is illustrated as a one bit field in the specific vector friendly instruction format 1600, the disclosure is not so limited (that is, the generic vector friendly instruction format 1500 contemplates other sizes of the data element width field 1564).

The generic vector friendly instruction format 1500 includes the following fields listed below in the order illustrated in FIG. 16A.

EVEX Prefix (Bytes 0-3) 1602—is encoded in a four-byte form.

Format Field 1540 (EVEX Byte 0, bits [7:0])—the first byte (EVEX Byte 0) is the format field 1540 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1605 (EVEX Byte 1, bits [7-5])—consists of a EVEX.R bit field (EVEX Byte 1, bit [7]—R), EVEX.X bit field (EVEX byte 1, bit [6]—X), and 1557BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1510—this is the first part of the REX' field 1510 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD RIM field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1615 (EVEX byte 1, bits [3:0]—mmmm)—its content encodes an implied leading opcode byte (0F, 0F 38, or 0F 3).

Data element width field 1564 (EVEX byte 2, bit [7]—W)—is represented by the notation EVEX.W. EVEX.W is used to define the granularity (size) of the datatype (either 32-bit data elements or 64-bit data elements).

EVEX.vvvv 1620 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1620 encodes the 4 low-order bits of the first source register specifier stored in inverted (1s complement) form. Depending on the instruction, an extra different EVEX bit field is used to extend the specifier size to 32 registers.

EVEX.U 1568 Class field (EVEX byte 2, bit [2]-U)—If EVEX.U=0, it indicates class A or EVEX.U0; if EVEX.U=1, it indicates class B or EVEX.U1.

Prefix encoding field 1625 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1552 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1554 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1510—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1570 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1630 (Byte 4) is also known as the opcode byte. Part of the opcode is specified in this field.

MOD R/M Field 1640 (Byte 5) includes MOD field 1642, Reg field 1644, and R/M field 1646. As previously described, the MOD field's 1642 content distinguishes between memory access and non-memory access operations. The role of Reg field 1644 can be summarized to two situations: encoding either the destination register operand or a source register operand, or be treated as an opcode extension and not used to encode any instruction operand. The role of R/M field 1646 may include the following: encoding the instruction operand that references a memory address, or encoding either the destination register operand or a source register operand.

Scale, Index, Base (SIB) Byte (Byte 6)—As previously described, the scale field's 1550 content is used for memory address generation. SIB.xxx 1654 and SIB.bbb 1656—the contents of these fields have been previously referred to with regard to the register indexes Xxxx and Bbbb.

Displacement field 1562A (Bytes 7-10)—when MOD field 1642 contains 10, bytes 7-10 are the displacement field 1562A, and it works the same as the legacy 32-bit displacement (disp32) and works at byte granularity.

Displacement factor field 1562B (Byte 7)—when MOD field 1642 contains 01, byte 7 is the displacement factor field 1562B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1562B is a reinterpretation of disp8; when using displacement factor field 1562B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1562B substitutes the legacy x86 instruction set 8-bit displacement. Thus, the displacement factor field 1562B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1572 operates as previously described.

Full Opcode Field

FIG. 16B is a block diagram illustrating the fields of the specific vector friendly instruction format 1600 that make up the full opcode field 1574 according to one embodiment of the disclosure. Specifically, the full opcode field 1574 includes the format field 1540, the base operation field 1542, and the data element width (W) field 1564. The base operation field 1542 includes the prefix encoding field 1625, the opcode map field 1615, and the real opcode field 1630.

Register Index Field

FIG. 16C is a block diagram illustrating the fields of the specific vector friendly instruction format 1600 that make up the register index field 1544 according to one embodiment of the disclosure. Specifically, the register index field 1544 includes the REX field 1605, the REX' field 1610, the MODR/M.reg field 1644, the MODR/M.r/m field 1646, the VVVV field 1620, xxx field 1654, and the bbb field 1656.

Augmentation Operation Field

Figure 16D:
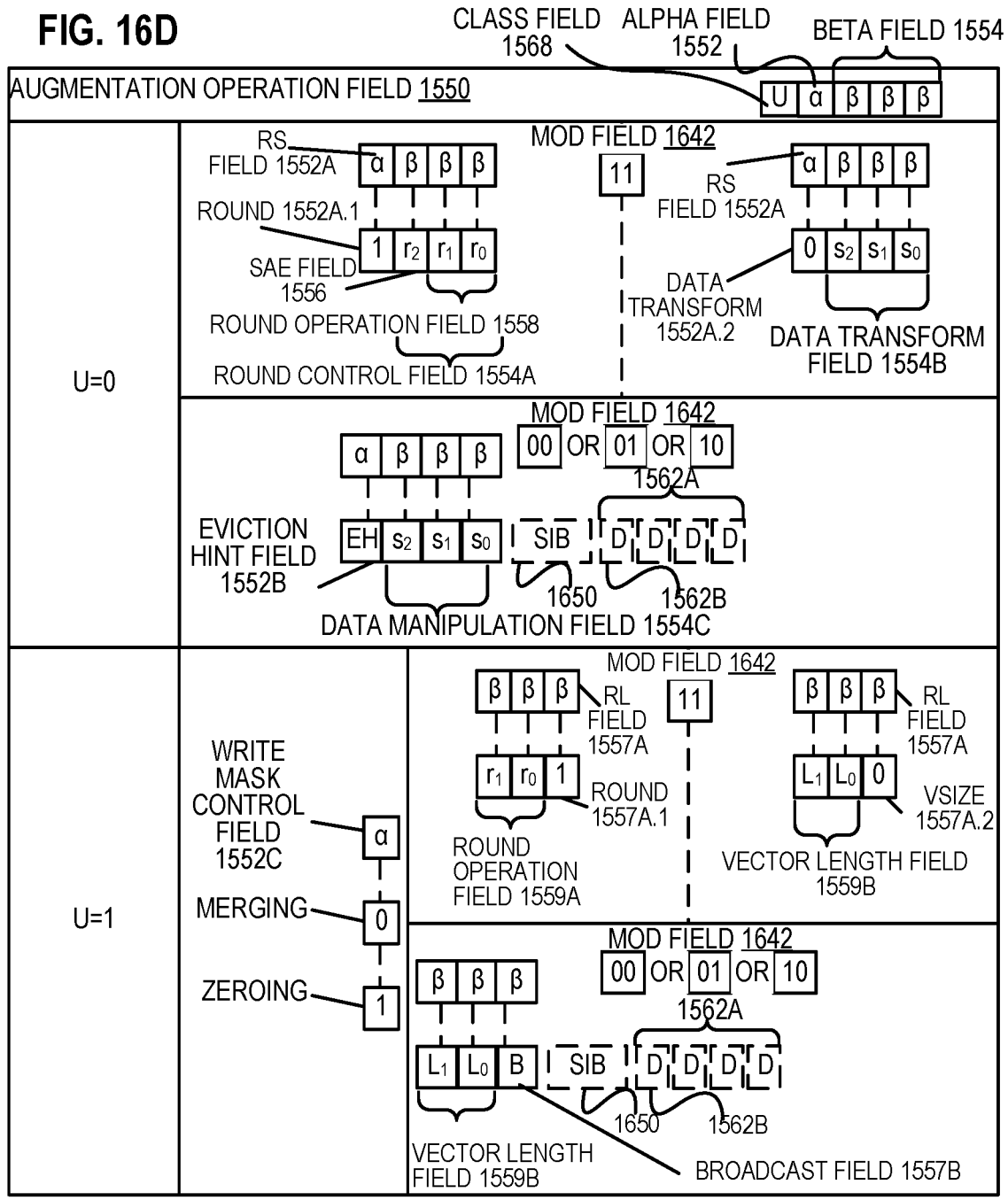
FIG. 16D is a block diagram illustrating the fields of the specific vector friendly instruction format in FIG. 16A that make up the augmentation operation field 1550 according to one embodiment of the disclosure.

FIG. 16D is a block diagram illustrating the fields of the specific vector friendly instruction format 1600 that make up the augmentation operation field 1550 according to one embodiment of the disclosure. When the class (U) field 1568 contains 0, it signifies EVEX.U0 (class A 1568A); when it contains 1, it signifies EVEX.U1 (class B 1568B). When U=0 and the MOD field 1642 contains 11 (signifying a no memory access operation), the alpha field 1552 (EVEX byte 3, bit [7]—EH) is interpreted as the rs field 1552A. When the rs field 1552A contains a 1 (round 1552A.1), the beta field 1554 (EVEX byte 3, bits [6:4]—SSS) is interpreted as the round control field 1554A. The round control field 1554A includes a one bit SAE field 1556 and a two bit round operation field 1558. When the rs field 1552A contains a 0 (data transform 1552A.2), the beta field 1554 (EVEX byte 3, bits [6:4]—SSS) is interpreted as a three bit data transform field 1554B. When U=0 and the MOD field 1642 contains 00, 01, or 10 (signifying a memory access operation), the alpha field 1552 (EVEX byte 3, bit [7]—EH) is interpreted as the eviction hint (EH) field 1552B and the beta field 1554 (EVEX byte 3, bits [6:4]—SSS) is interpreted as a three bit data manipulation field 1554C.

When U=1, the alpha field 1552 (EVEX byte 3, bit [7]—EH) is interpreted as the write mask control (Z) field 1552C. When U=1 and the MOD field 1642 contains 11 (signifying a no memory access operation), part of the beta field 1554 (EVEX byte 3, bit [4]—$S_0$) is interpreted as the RL field 1557A; when it contains a 1 (round 1557A.1) the rest of the beta field 1554 (EVEX byte 3, bit [6-5]—$S_{2-1}$) is interpreted as the round operation field 1559A, while when the RL field 1557A contains a 0 (VSIZE 1557.A2) the rest of the beta field 1554 (EVEX byte 3, bit [6-5]—$S_{2-1}$) is interpreted as the vector length field 1559B (EVEX byte 3, bit [6-5]—$L_{1-0}$). When U=1 and the MOD field 1642 contains 00, 01, or 10 (signifying a memory access operation), the beta field 1554 (EVEX byte 3, bits [6:4]—SSS) is interpreted as the vector length field 1559B (EVEX byte 3, bit [6-5]—$L_{1-0}$) and the broadcast field 1557B (EVEX byte 3, bit [4]-B).

Exemplary Register Architecture

Figure 17:
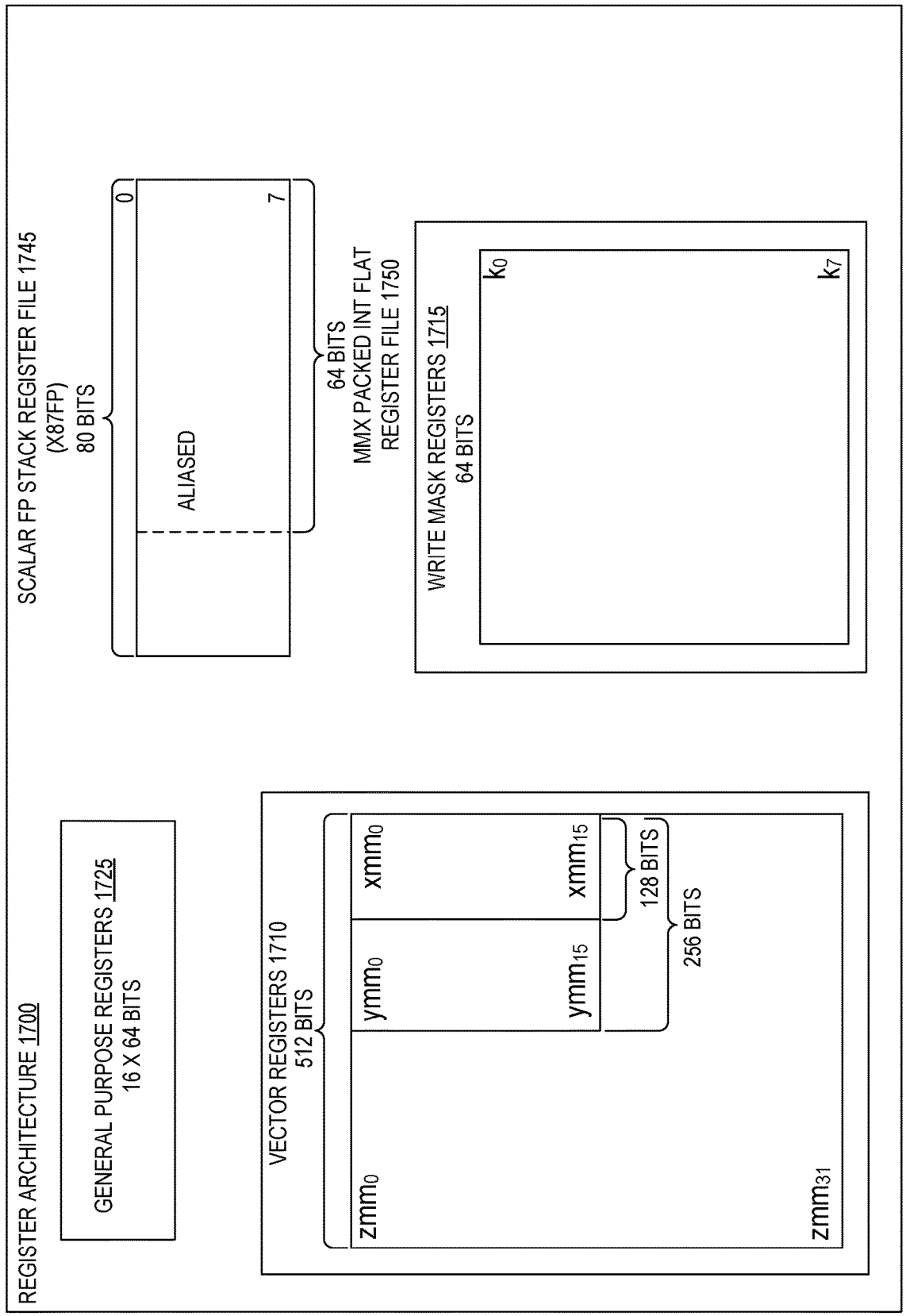
FIG. 17 is a block diagram of a register architecture according to one embodiment of the disclosure

FIG. 17 is a block diagram of a register architecture 1700 according to one embodiment of the disclosure. In the embodiment illustrated, there are 32 vector registers 1710 that are 512 bits wide; these registers are referenced as ZMM0 through ZMM31. The lower order 256 bits of the lower 16 ZMM registers are overlaid on registers ymm0-16. The lower order 128 bits of the lower 16 ZMM registers (the lower order 128 bits of the ymm registers) are overlaid on registers xmm0-15. The specific vector friendly instruction format 1600 operates on these overlaid register file as illustrated in the below tables.

| Adjustable Vector Length | Class | Operations | Registers |
|---|---|---|---|
| Instruction Templates that do not include the vector length field 1559B | A (FIG. 15A; U = 0) B (FIG. 15B; U = 1) | 1510, 1515, 1525, 1530 1512 | ZMM registers (the vector length is 64 byte) ZMM registers (the vector length is 64 byte) |
| Instruction templates that do include the vector length field 1559B | B (FIG. 15B; U = 1) | 1517, 1527 | ZMM, ymm, or xmm registers (the vector length is 64 byte, 32 byte, or 16 byte) depending on the vector length field 1559B |

In other words, the vector length field 1559B selects between a maximum length and one or more other shorter lengths, where each such shorter length is half the length of the preceding length; and instructions templates without the vector length field 1559B operate on the maximum vector length. Further, in one embodiment, the class B instruction templates of the specific vector friendly instruction format 1600 operate on packed or scalar single/double-precision floating point data and packed or scalar integer data. Scalar operations are operations performed on the lowest order data element position in an ZMM/ymm/xmm register; the higher order data element positions are either left the same as they were prior to the instruction or zeroed depending on the embodiment.

Write mask registers 1715—in the embodiment illustrated, there are 8 write mask registers (k0 through k7), each 64 bits in size. In an alternate embodiment, the write mask registers 1715 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1745, on which is aliased the MMX packed integer flat register file 1750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 18A is a block diagram illustrating both an exemplary in-order pipeline and an exemplary register renaming, out-of-order issue/execution pipeline according to embodiments of the disclosure. FIG. 18B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 18A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 18A, a processor pipeline 1800 includes a fetch stage 1802, a length decode stage 1804, a decode stage 1806, an allocation stage 1808, a renaming stage 1810, a scheduling (also known as a dispatch or issue) stage 1812, a register read/memory read stage 1814, an execute stage 1816, a write back/memory write stage 1818, an exception handling stage 1822, and a commit stage 1824.

FIG. 18B shows processor core 1890 including a front end unit 1830 coupled to an execution engine unit 1850, and both are coupled to a memory unit 1870. The core 1890 may be a reduced instruction set computing (RISC) core, a complex instruction set computing (CISC) core, a very long instruction word (VLIW) core, or a hybrid or alternative core type. As yet another option, the core 1890 may be a special-purpose core, such as, for example, a network or communication core, compression engine, coprocessor core, general purpose computing graphics processing unit (GPGPU) core, graphics core, or the like.

The front end unit 1830 includes a branch prediction unit 1832 coupled to an instruction cache unit 1834, which is coupled to an instruction translation lookaside buffer (TLB) 1836, which is coupled to an instruction fetch unit 1838, which is coupled to a decode unit 1840. The decode unit 1840 (or decoder or decoder unit) may decode instructions (e.g., macro-instructions), and generate as an output one or more micro-operations, micro-code entry points, microinstructions, other instructions, or other control signals, which are decoded from, or which otherwise reflect, or are derived from, the original instructions. The decode unit 1840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1890 includes a microcode ROM or other medium that stores microcode for certain macro-instructions (e.g., in decode unit 1840 or otherwise within the front end unit 1830). The decode unit 1840 is coupled to a rename/allocator unit 1852 in the execution engine unit 1850.

The execution engine unit 1850 includes the rename/allocator unit 1852 coupled to a retirement unit 1854 and a set of one or more scheduler unit(s) 1856. The scheduler unit(s) 1856 represents any number of different schedulers, including reservations stations, central instruction window, etc. The scheduler unit(s) 1856 is coupled to the physical register file(s) unit(s) 1858. Each of the physical register file(s) units 1858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1858 comprises a vector registers unit, a write mask registers unit, and a scalar registers unit. These register units may provide architectural vector registers, vector mask registers, and general purpose registers. The physical register file(s) unit(s) 1858 is overlapped by the retirement unit 1854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1854 and the physical register file(s) unit(s) 1858 are coupled to the execution cluster(s) 1860. The execution cluster(s) 1860 includes a set of one or more execution units 1862 and a set of one or more memory access units 1864. The execution units 1862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1856, physical register file(s) unit(s) 1858, and execution cluster(s) 1860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1864). It should also be understood that where separate pipelines are used, one or more of these pipelines may be out-of-order issue/execution and the rest in-order.

The set of memory access units 1864 is coupled to the memory unit 1870, which includes a data TLB unit 1872 coupled to a data cache unit 1874 coupled to a level 2 (L2) cache unit 1876. In one exemplary embodiment, the memory access units 1864 may include a load unit, a store address unit, and a store data unit, each of which is coupled to the data TLB unit 1872 in the memory unit 1870. The instruction cache unit 1834 is further coupled to a level 2 (L2) cache unit 1876 in the memory unit 1870. The L2 cache unit 1876 is coupled to one or more other levels of cache and eventually to a main memory.

By way of example, the exemplary register renaming, out-of-order issue/execution core architecture may implement the pipeline 1800 as follows: 1) the instruction fetch 1838 performs the fetch and length decoding stages 1802 and 1804; 2) the decode unit 1840 performs the decode stage 1806; 3) the rename/allocator unit 1852 performs the allocation stage 1808 and renaming stage 1810; 4) the scheduler unit(s) 1856 performs the schedule stage 1812; 5) the physical register file(s) unit(s) 1858 and the memory unit 1870 perform the register read/memory read stage 1814; the execution cluster 1860 perform the execute stage 1816; 6) the memory unit 1870 and the physical register file(s) unit(s) 1858 perform the write back/memory write stage 1818; 7) various units may be involved in the exception handling stage 1822; and 8) the retirement unit 1854 and the physical register file(s) unit(s) 1858 perform the commit stage 1824.

The core 1890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1834/1874 and a shared L2 cache unit 1876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 19B:
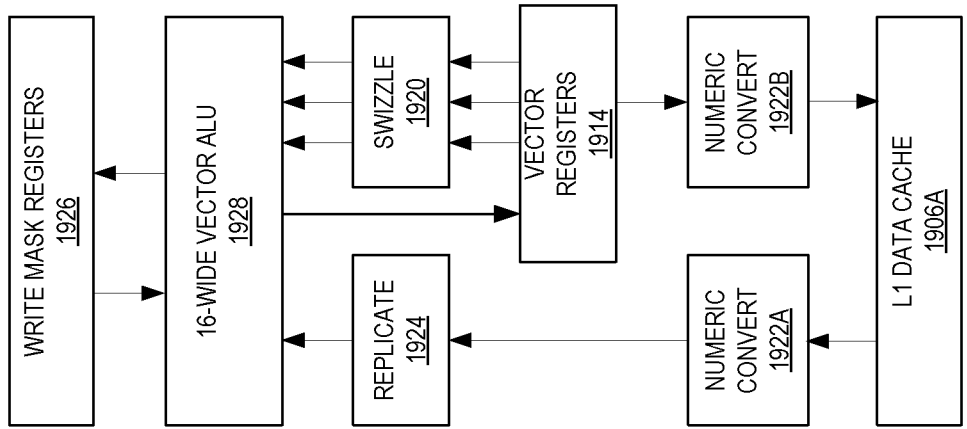
FIG. 19B is an expanded view of part of the processor core in FIG. 19A according to embodiments of the disclosure.
Figure 19A:
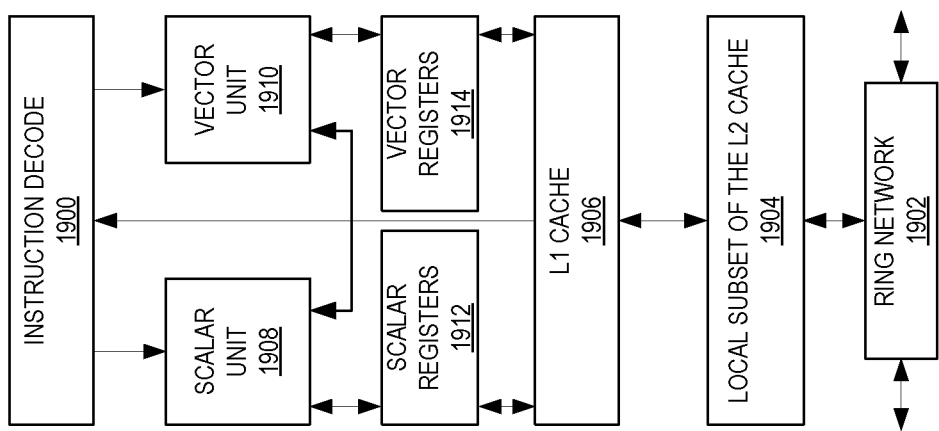
FIG. 19A is a block diagram of a single processor core, along with its connection to the on-die interconnect network and with its local subset of the Level 2 (L2) cache, according to embodiments of the disclosure.

FIGS. 19A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 19A is a block diagram of a single processor core, along with its connection to the on-die interconnect network 1902 and with its local subset of the Level 2 (L2) cache 1904, according to embodiments of the disclosure. In one embodiment, an instruction decode unit 1900 supports the x86 instruction set with a packed data instruction set extension. An L1 cache 1906 allows low-latency accesses to cache memory into the scalar and vector units. While in one embodiment (to simplify the design), a scalar unit 1908 and a vector unit 1910 use separate register sets (respectively, scalar registers 1912 and vector registers 1914) and data transferred between them is written to memory and then read back in from a level 1 (L1) cache 1906, alternative embodiments of the disclosure may use a different approach (e.g., use a single register set or include a communication path that allow data to be transferred between the two register files without being written and read back).

The local subset of the L2 cache 1904 is part of a global L2 cache that is divided into separate local subsets, one per processor core. Each processor core has a direct access path to its own local subset of the L2 cache 1904. Data read by a processor core is stored in its L2 cache subset 1904 and can be accessed quickly, in parallel with other processor cores accessing their own local L2 cache subsets. Data written by a processor core is stored in its own L2 cache subset 1904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 19B is an expanded view of part of the processor core in FIG. 19A according to embodiments of the disclosure. FIG. 19B includes an L1 data cache 1906A part of the L1 cache 1904, as well as more detail regarding the vector unit 1910 and the vector registers 1914. Specifically, the vector unit 1910 is a 16-wide vector processing unit (VPU) (see the 16-wide ALU 1928), which executes one or more of integer, single-precision float, and double-precision float instructions. The VPU supports swizzling the register inputs with swizzle unit 1920, numeric conversion with numeric convert units 1922A-B, and replication with replication unit 1924 on the memory input. Write mask registers 1926 allow predicating resulting vector writes.

Figure 20:
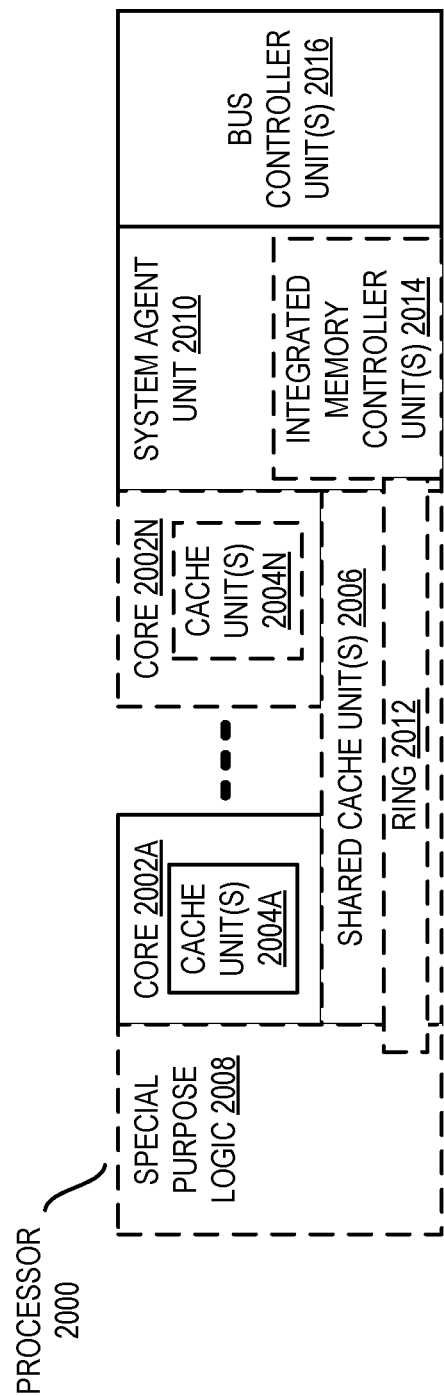
FIG. 20 is a block diagram of a processor that may have more than one core, may have an integrated memory controller, and may have integrated graphics according to embodiments of the disclosure.

FIG. 20 is a block diagram of a processor 2000 that may have more than one core, may have an integrated memory controller, and may have integrated graphics according to embodiments of the disclosure. The solid lined boxes in FIG. 20 illustrate a processor 2000 with a single core 2002A, a system agent 2010, a set of one or more bus controller units 2016, while the optional addition of the dashed lined boxes illustrates an alternative processor 2000 with multiple cores 2002A-N, a set of one or more integrated memory controller unit(s) 2014 in the system agent unit 2010, and special purpose logic 2008.

Thus, different implementations of the processor 2000 may include: 1) a CPU with the special purpose logic 2008 being integrated graphics and/or scientific (throughput) logic (which may include one or more cores), and the cores 2002A-N being one or more general purpose cores (e.g., general purpose in-order cores, general purpose out-of-order cores, a combination of the two); 2) a coprocessor with the cores 2002A-N being a large number of special purpose cores intended primarily for graphics and/or scientific (throughput); and 3) a coprocessor with the cores 2002A-N being a large number of general purpose in-order cores. Thus, the processor 2000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2006, and external memory (not shown) coupled to the set of integrated memory controller units 2014. The set of shared cache units 2006 may include one or more mid-level caches, such as level 2 (L2), level 3 (L3), level 4 (L4), or other levels of cache, a last level cache (LLC), and/or combinations thereof. While in one embodiment a ring based interconnect unit 2012 interconnects the integrated graphics logic 2008, the set of shared cache units 2006, and the system agent unit 2010/integrated memory controller unit(s) 2014, alternative embodiments may use any number of well-known techniques for interconnecting such units. In one embodiment, coherency is maintained between one or more cache units 2006 and cores 2002-A-N.

In some embodiments, one or more of the cores 2002A-N are capable of multi-threading. The system agent 2010 includes those components coordinating and operating cores 2002A-N. The system agent unit 2010 may include for example a power control unit (PCU) and a display unit. The PCU may be or include logic and components needed for regulating the power state of the cores 2002A-N and the integrated graphics logic 2008. The display unit is for driving one or more externally connected displays.

The cores 2002A-N may be homogenous or heterogeneous in terms of architecture instruction set; that is, two or more of the cores 2002A-N may be capable of execution the same instruction set, while others may be capable of executing only a subset of that instruction set or a different instruction set.

Exemplary Computer Architectures

FIGS. 21-24 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 21:
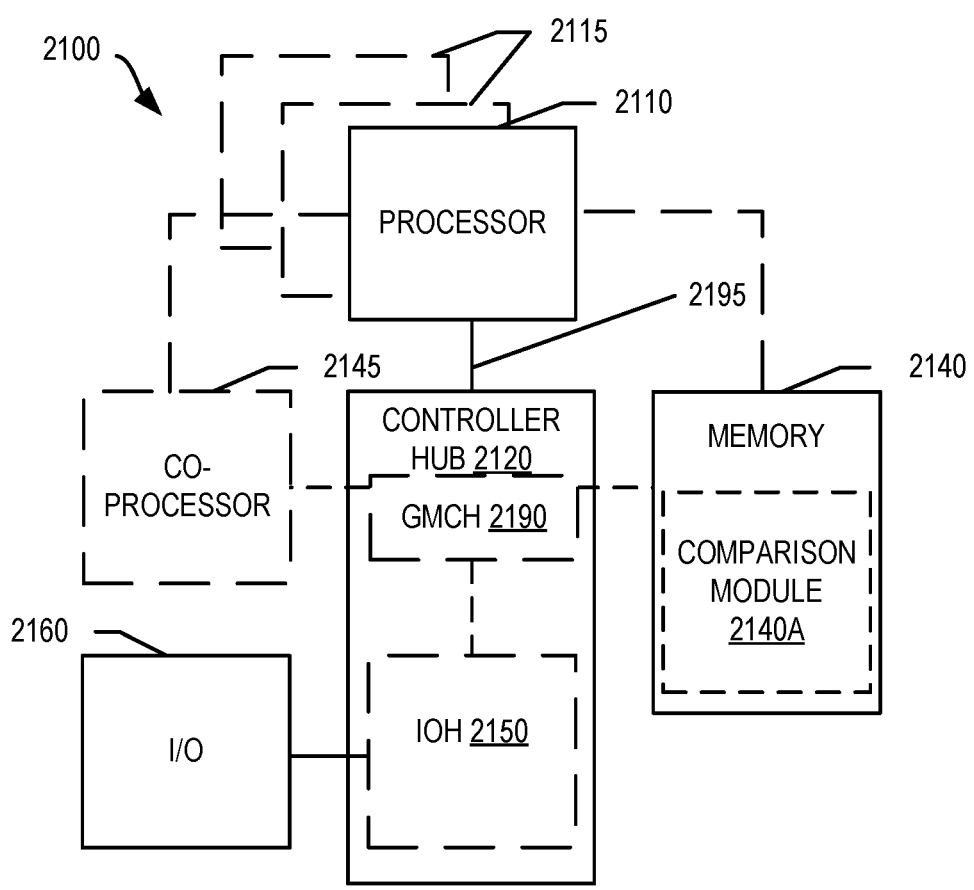
FIG. 21 is a block diagram of a system in accordance with one embodiment of the present disclosure.

Referring now to FIG. 21, shown is a block diagram of a system 2100 in accordance with one embodiment of the present disclosure. The system 2100 may include one or more processors 2110, 2115, which are coupled to a controller hub 2120. In one embodiment the controller hub 2120 includes a graphics memory controller hub (GMCH) 2190 and an Input/Output Hub (IOH) 2150 (which may be on separate chips); the GMCH 2190 includes memory and graphics controllers to which are coupled memory 2140 and a coprocessor 2145; the IOH 2150 is couples input/output (I/O) devices 2160 to the GMCH 2190. Alternatively, one or both of the memory and graphics controllers are integrated within the processor (as described herein), the memory 2140 and the coprocessor 2145 are coupled directly to the processor 2110, and the controller hub 2120 in a single chip with the IOH 2150. Memory 2140 may include a comparison module 2140A, for example, to store code that when executed causes a processor to perform any method of this disclosure.

The optional nature of additional processors 2115 is denoted in FIG. 21 with broken lines. Each processor 2110, 2115 may include one or more of the processing cores described herein and may be some version of the processor 2000.

The memory 2140 may be, for example, dynamic random access memory (DRAM), phase change memory (PCM), or a combination of the two. For at least one embodiment, the controller hub 2120 communicates with the processor(s) 2110, 2115 via a multi-drop bus, such as a frontside bus (FSB), point-to-point interface such as QuickPath Interconnect (QPI), or similar connection 2195.

In one embodiment, the coprocessor 2145 is a special-purpose processor, such as, for example, a high-throughput MIC processor, a network or communication processor, compression engine, graphics processor, GPGPU, embedded processor, or the like. In one embodiment, controller hub 2120 may include an integrated graphics accelerator.

There can be a variety of differences between the physical resources 2110, 2115 in terms of a spectrum of metrics of merit including architectural, microarchitectural, thermal, power consumption characteristics, and the like.

In one embodiment, the processor 2110 executes instructions that control data processing operations of a general type. Embedded within the instructions may be coprocessor instructions. The processor 2110 recognizes these coprocessor instructions as being of a type that should be executed by the attached coprocessor 2145. Accordingly, the processor 2110 issues these coprocessor instructions (or control signals representing coprocessor instructions) on a coprocessor bus or other interconnect, to coprocessor 2145. Coprocessor(s) 2145 accept and execute the received coprocessor instructions.

Figure 22:
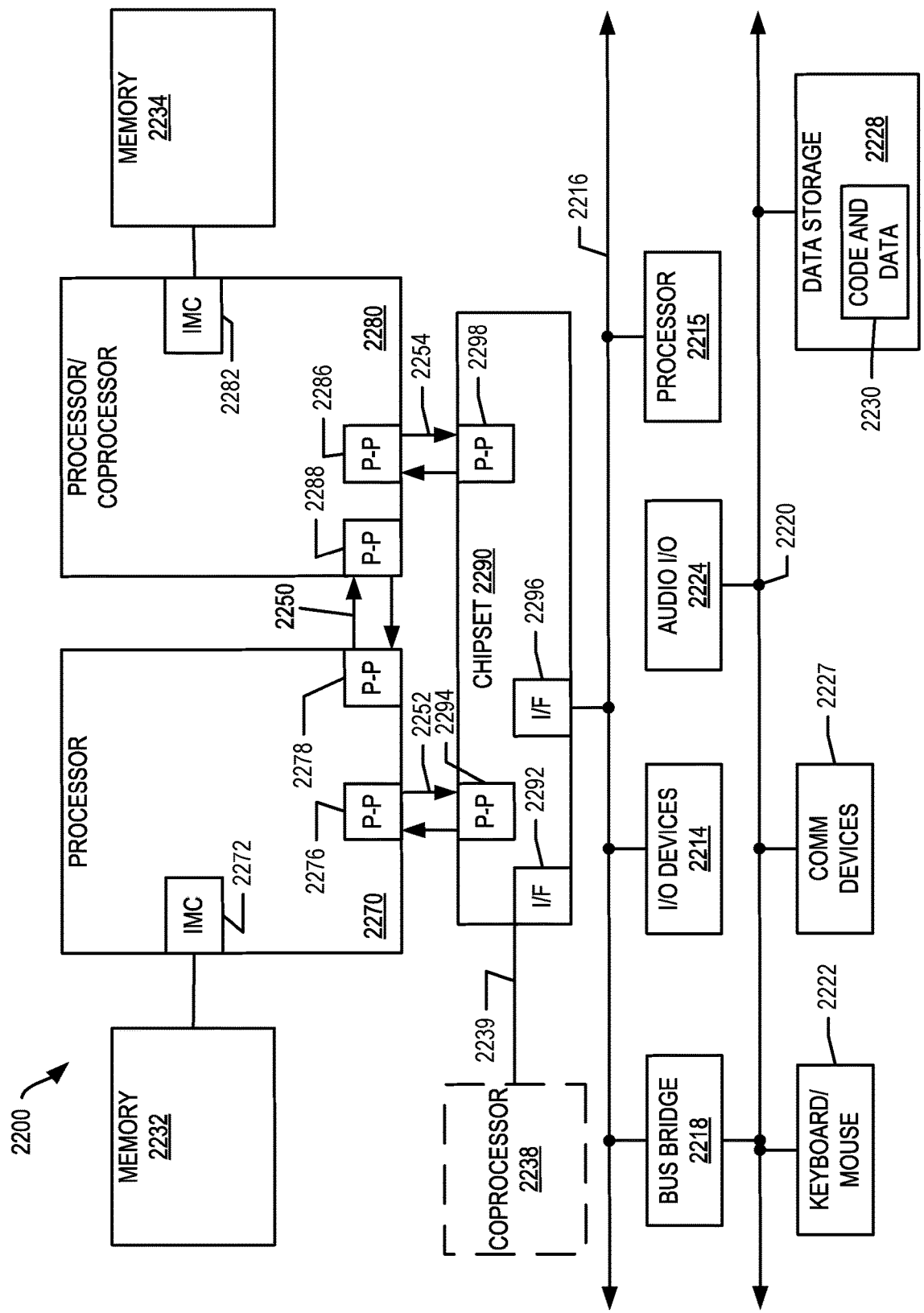
FIG. 22 is a block diagram of a more specific exemplary system in accordance with an embodiment of the present disclosure.

Referring now to FIG. 22, shown is a block diagram of a first more specific exemplary system 2200 in accordance with an embodiment of the present disclosure. As shown in FIG. 22, multiprocessor system 2200 is a point-to-point interconnect system, and includes a first processor 2270 and a second processor 2280 coupled via a point-to-point interconnect 2250. Each of processors 2270 and 2280 may be some version of the processor 2000. In one embodiment of the disclosure, processors 2270 and 2280 are respectively processors 2110 and 2115, while coprocessor 2238 is coprocessor 2145. In another embodiment, processors 2270 and 2280 are respectively processor 2110 coprocessor 2145.

Processors 2270 and 2280 are shown including integrated memory controller (IMC) units 2272 and 2282, respectively. Processor 2270 also includes as part of its bus controller units point-to-point (P-P) interfaces 2276 and 2278; similarly, second processor 2280 includes P-P interfaces 2286 and 2288. Processors 2270, 2280 may exchange information via a point-to-point (P-P) interface 2250 using P-P interface circuits 2278, 2288. As shown in FIG. 22, IMCs 2272 and 2282 couple the processors to respective memories, namely a memory 2232 and a memory 2234, which may be portions of main memory locally attached to the respective processors.

Processors 2270, 2280 may each exchange information with a chipset 2290 via individual P-P interfaces 2252, 2254 using point to point interface circuits 2276, 2294, 2286, 2298. Chipset 2290 may optionally exchange information with the coprocessor 2238 via a high-performance interface 2239. In one embodiment, the coprocessor 2238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2290 may be coupled to a first bus 2216 via an interface 2296. In one embodiment, first bus 2216 may be a Peripheral Component Interconnect (PCI) bus, or a bus such as a PCI Express bus or another third generation I/O interconnect bus, although the scope of the present disclosure is not so limited.

As shown in FIG. 22, various I/O devices 2214 may be coupled to first bus 2216, along with a bus bridge 2218 which couples first bus 2216 to a second bus 2220. In one embodiment, one or more additional processor(s) 2215, such as coprocessors, high-throughput MIC processors, GPGPU's, accelerators (such as, e.g., graphics accelerators or digital signal processing (DSP) units), field programmable gate arrays, or any other processor, are coupled to first bus 2216. In one embodiment, second bus 2220 may be a low pin count (LPC) bus. Various devices may be coupled to a second bus 2220 including, for example, a keyboard and/or mouse 2222, communication devices 2227 and a storage unit 2228 such as a disk drive or other mass storage device which may include instructions/code and data 2230, in one embodiment. Further, an audio I/O 2224 may be coupled to the second bus 2220. Note that other architectures are possible. For example, instead of the point-to-point architecture of FIG. 22, a system may implement a multi-drop bus or other such architecture.

Figure 23:
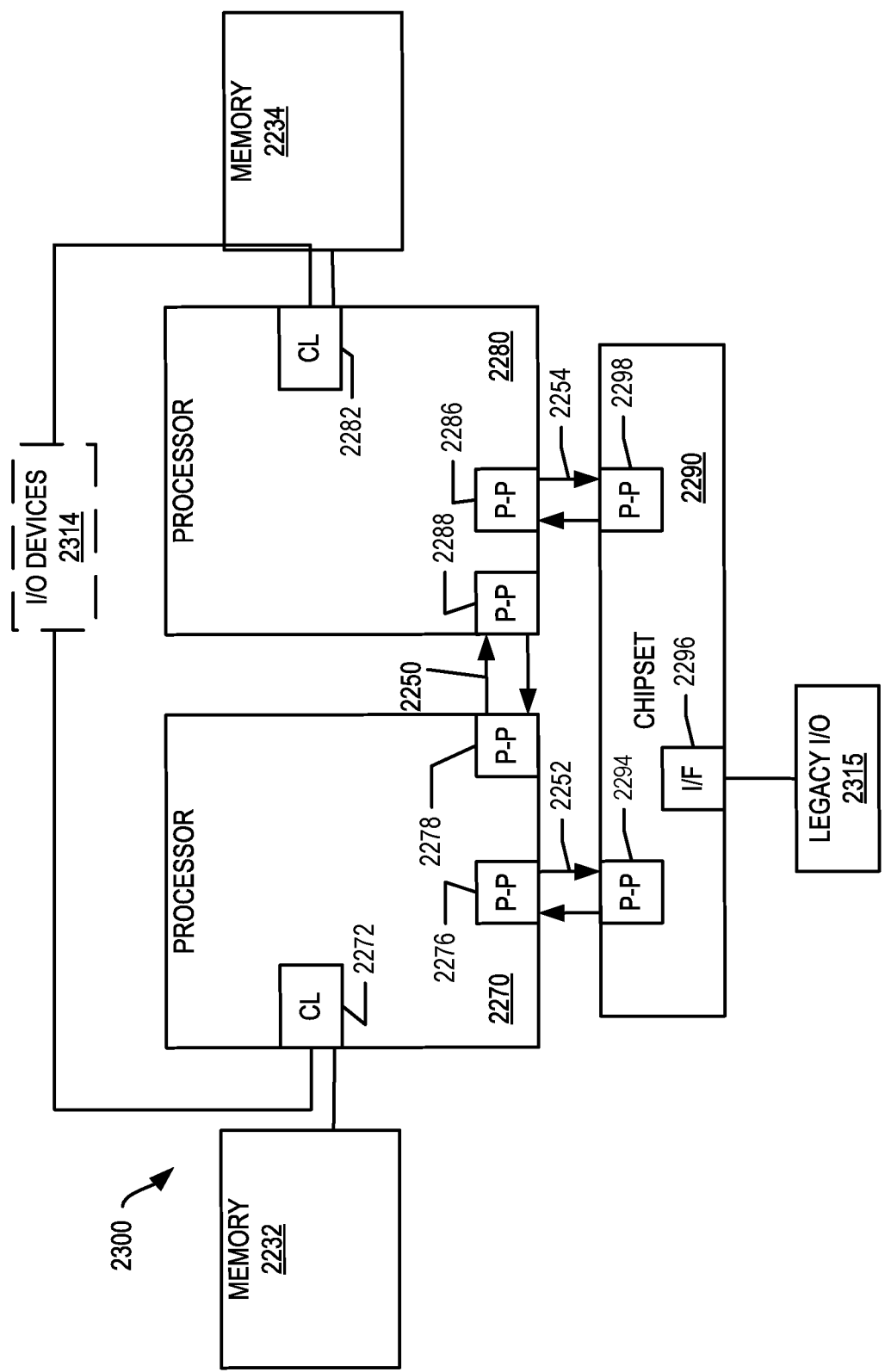
FIG. 23, shown is a block diagram of a second more specific exemplary system in accordance with an embodiment of the present disclosure.

Referring now to FIG. 23, shown is a block diagram of a second more specific exemplary system 2300 in accordance with an embodiment of the present disclosure Like elements in FIGS. 22 and 23 bear like reference numerals, and certain aspects of FIG. 22 have been omitted from FIG. 23 in order to avoid obscuring other aspects of FIG. 23.

FIG. 23 illustrates that the processors 2270, 2280 may include integrated memory and I/O control logic ("CL") 2272 and 2282, respectively. Thus, the CL 2272, 2282 include integrated memory controller units and include I/O control logic. FIG. 23 illustrates that not only are the memories 2232, 2234 coupled to the CL 2272, 2282, but also that I/O devices 2314 are also coupled to the control logic 2272, 2282. Legacy I/O devices 2315 are coupled to the chipset 2290.

Figure 24:
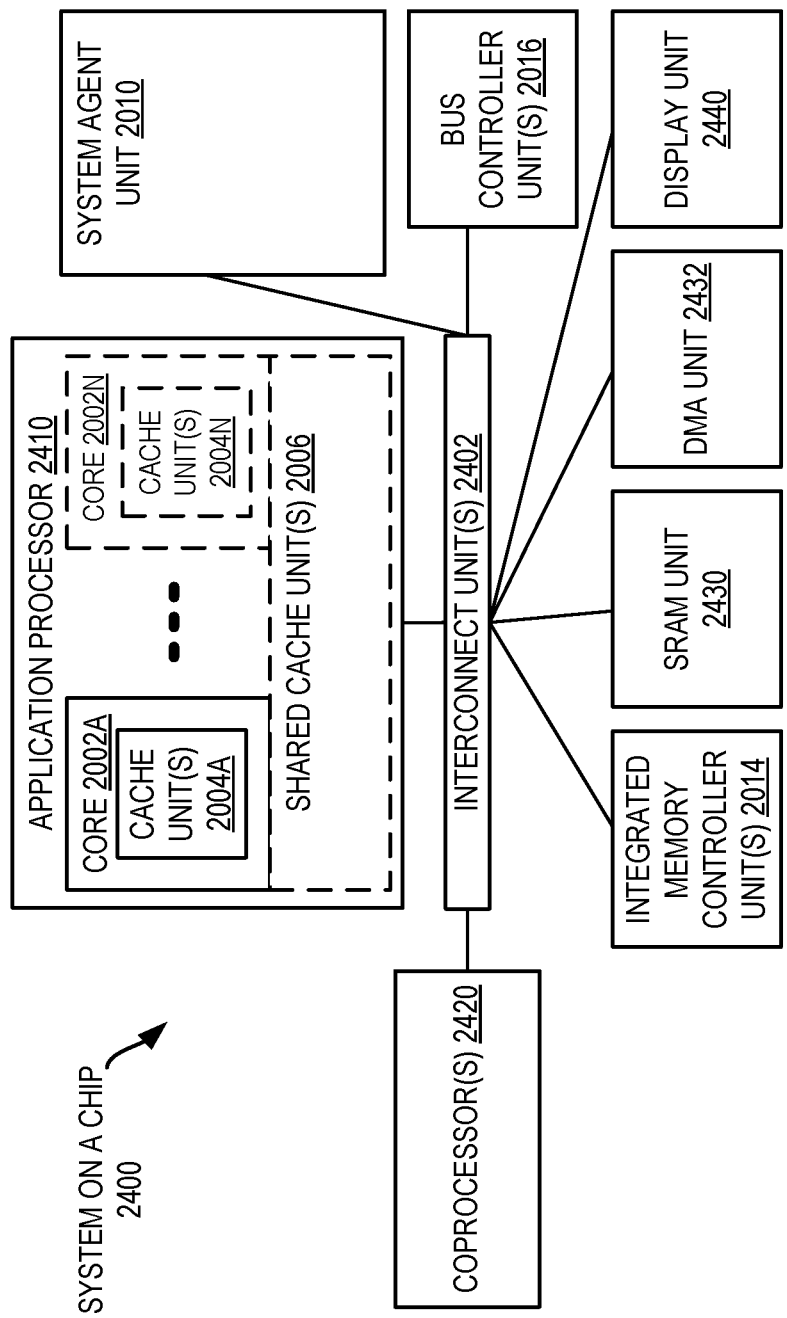
FIG. 24, shown is a block diagram of a system on a chip (SoC) in accordance with an embodiment of the present disclosure.

Referring now to FIG. 24, shown is a block diagram of a SoC 2400 in accordance with an embodiment of the present disclosure. Similar elements in FIG. 20 bear like reference numerals. Also, dashed lined boxes are optional features on more advanced SoCs. In FIG. 24, an interconnect unit(s) 2402 is coupled to: an application processor 2410 which includes a set of one or more cores 202A-N and shared cache unit(s) 2006; a system agent unit 2010; a bus controller unit(s) 2016; an integrated memory controller unit(s) 2014; a set or one or more coprocessors 2420 which may include integrated graphics logic, an image processor, an audio processor, and a video processor; an static random access memory (SRAM) unit 2430; a direct memory access (DMA) unit 2432; and a display unit 2440 for coupling to one or more external displays. In one embodiment, the coprocessor(s) 2420 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 2230 illustrated in FIG. 22, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 25:
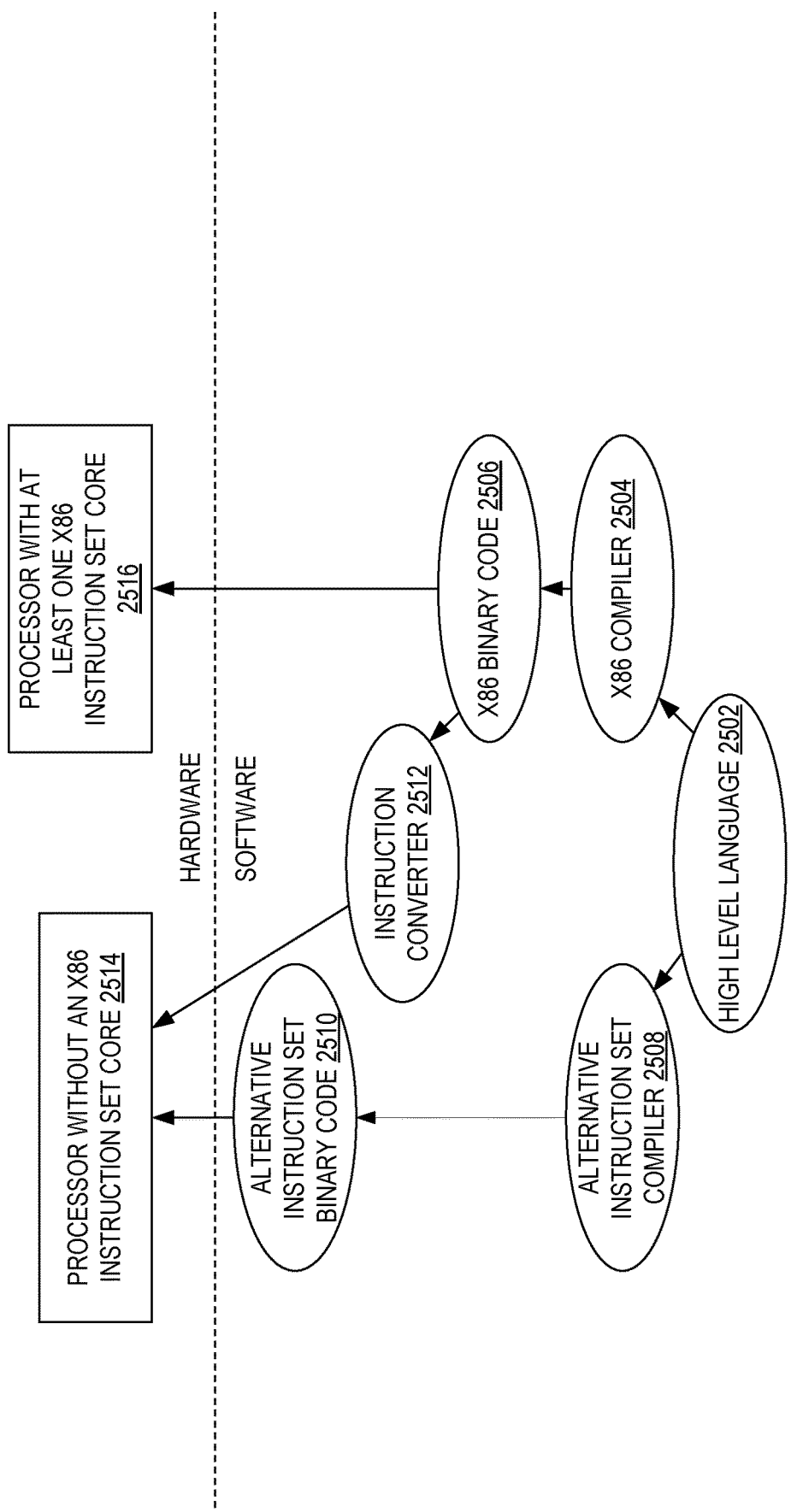
FIG. 25 is a block diagram contrasting the use of a software instruction converter to convert binary instructions in a source instruction set to binary instructions in a target instruction set according to embodiments of the disclosure.

FIG. 25 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 25 shows a program in a high level language 2502 may be compiled using an x86 compiler 2504 to generate x86 binary code 2506 that may be natively executed by a processor with at least one x86 instruction set core 2516. The processor with at least one x86 instruction set core 2516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2504 represents a compiler that is operable to generate x86 binary code 2506 (e.g., object code) that can, with or without additional linkage processing, be executed on the processor with at least one x86 instruction set core 2516. Similarly, FIG. 25 shows the program in the high level language 2502 may be compiled using an alternative instruction set compiler 2508 to generate alternative instruction set binary code 2510 that may be natively executed by a processor without at least one x86 instruction set core 2514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2512 is used to convert the x86 binary code 2506 into code that may be natively executed by the processor without an x86 instruction set core 2514. This converted code is not likely to be the same as the alternative instruction set binary code 2510 because an instruction converter capable of this is difficult to make; however, the converted code will accomplish the general operation and be made up of instructions from the alternative instruction set. Thus, the instruction converter 2512 represents software, firmware, hardware, or a combination thereof that, through emulation, simulation or any other process, allows a processor or other electronic device that does not have an x86 instruction set processor or core to execute the x86 binary code 2506.

What is claimed is:

1. A processor comprising:
    a decoder to decode a single instruction into a decoded single instruction, the single instruction comprising at least one input vector of a plurality of numerically unsorted index elements of index and value pairs; and
    an execution unit to execute the decoded single instruction to:
        perform a comparison operation on each numerically unsorted index element of the at least one input vector against the other numerically unsorted index elements of the at least one input vector to generate a comparison value for each numerically unsorted index element of the at least one input vector against the other numerically unsorted index elements,
        generate a numerically sorted index vector from the comparison values that includes a set of duplicate index elements, and
        store, into an output vector, value elements corresponding to the numerically sorted index vector with each value element for the set of duplicate index elements in a separate element of the output vector and in a same order as in the at least one input vector.

2. The processor of claim 1, wherein the plurality of numerically unsorted index elements is at least three numerically unsorted index elements.

3. The processor of claim 1, wherein the at least one input vector comprises a first input vector comprising the plurality of numerically unsorted index elements of the index and value pairs, and a second input vector comprising a plurality of numerically unsorted value elements of the index and value pairs.

4. The processor of claim 1, wherein the execution unit is to execute the decoded single instruction to perform the comparison operation by:
    providing storage for a comparison matrix to store the comparison value for each numerically unsorted index element of the at least one input vector compared against the other numerically unsorted index elements of the at least one input vector;
    performing a comparison operation on numerically unsorted index elements of the at least one input vector corresponding to storage of comparison values above a main diagonal of the comparison matrix;
    performing a different operation on numerically unsorted index elements of the at least one input vector corresponding to storage of comparison values below the main diagonal of the comparison matrix; and storing results of the comparison operation and the different operation in the comparison matrix.

5. The processor of claim 4, wherein the different operation is a different comparison operation than the comparison operation.

6. The processor of claim 5, wherein the comparison operation is one of a greater than or equal to operation and a greater than operation, and the different comparison operation is the other.

7. The processor of claim 4, wherein the different operation is an anti-symmetrical operation to be performed on the numerically unsorted index elements of the at least one input vector corresponding to storage of comparison values above the main diagonal of the comparison matrix.

8. The processor of claim 7, wherein the anti-symmetrical operation is to invert, with a thermometer constant matrix, a comparison value into an inverted comparison value for each of the numerically unsorted index elements of the at least one input vector corresponding to storage of comparison values above the main diagonal of the comparison matrix.

9. A method comprising:
    decoding a single instruction with a decoder of a processor into a decoded single instruction, the single instruction comprising at least one input vector of a plurality of numerically unsorted index elements of index and value pairs; and
    executing the decoded single instruction with an execution unit of the processor to:
        perform a comparison operation on each numerically unsorted index element of the at least one input vector against the other numerically unsorted index elements of the at least one input vector to generate a comparison value for each numerically unsorted index element of the at least one input vector against the other numerically unsorted index elements,
        generate a numerically sorted index vector from the comparison values that includes a set of duplicate index elements, and
        store, into an output vector, value elements corresponding to the numerically sorted index vector with each value element for the set of duplicate index elements in a separate element of the output vector and in a same order as in the at least one input vector.

10. The method of claim 9, wherein the plurality of numerically unsorted index elements is at least three numerically unsorted index elements.

11. The method of claim 9, wherein the at least one input vector comprises a first input vector comprising the plurality of numerically unsorted index elements of the index and value pairs, and a second input vector comprising a plurality of numerically unsorted value elements of the index and value pairs.

12. The method of claim 9, wherein the executing the decoded single instruction to perform the comparison operation comprises:
    providing storage for a comparison matrix to store the comparison value for each numerically unsorted index element of the at least one input vector compared against the other numerically unsorted index elements of the at least one input vector;
    performing a comparison operation on numerically unsorted index elements of the at least one input vector corresponding to storage of comparison values above a main diagonal of the comparison matrix;
    performing a different operation on numerically unsorted index elements of the at least one input vector corresponding to storage of comparison values below the main diagonal of the comparison matrix; and
    storing results of the comparison operation and the different operation in the comparison matrix.

13. The method of claim 12, wherein the different operation is a different comparison operation than the comparison operation.

14. The method of claim 13, wherein the comparison operation is one of a greater than or equal to operation and a greater than operation, and the different comparison operation is the other.

15. The method of claim 12, wherein the different operation is an anti-symmetrical operation to be performed on the numerically unsorted index elements of the at least one input vector corresponding to storage of comparison values above the main diagonal of the comparison matrix.

16. The method of claim 15, wherein the anti-symmetrical operation is to invert, with a thermometer constant matrix, a comparison value into an inverted comparison value for each of the numerically unsorted index elements of the at least one input vector corresponding to storage of comparison values above the main diagonal of the comparison matrix.

17. A non-transitory machine readable medium that stores code that when executed by a machine causes the machine to perform a method comprising:
    decoding a single instruction with a decoder of a processor into a decoded single instruction, the single instruction comprising at least one input vector of a plurality of numerically unsorted index elements of index and value pairs; and
    executing the decoded single instruction with an execution unit of the processor to:
        perform a comparison operation on each numerically unsorted index element of the at least one input vector against the other numerically unsorted index elements of the at least one input vector to generate a comparison value for each numerically unsorted index element of the at least one input vector against the other numerically unsorted index elements,
        generate a numerically sorted index vector from the comparison values that includes a set of duplicate index elements, and
        store, into an output vector, value elements corresponding to the numerically sorted index vector with each value element for the set of duplicate index elements in a separate element of the output vector and in a same order as in the at least one input vector.

18. The non-transitory machine readable medium of claim 17, wherein the plurality of numerically unsorted index elements is at least three numerically unsorted index elements.

19. The non-transitory machine readable medium of claim 17, wherein the at least one input vector comprises a first input vector comprising the plurality of numerically unsorted index elements of the index and value pairs, and a second input vector comprising a plurality of numerically unsorted value elements of the index and value pairs.

20. The non-transitory machine readable medium of claim 17, wherein the executing the decoded single instruction to perform the comparison operation comprises:
    providing storage for a comparison matrix to store the comparison value for each numerically unsorted index element of the at least one input vector compared against the other numerically unsorted index elements of the at least one input vector;

performing a comparison operation on numerically unsorted index elements of the at least one input vector corresponding to storage of comparison values above a main diagonal of the comparison matrix;

performing a different operation on numerically unsorted index elements of the at least one input vector corresponding to storage of comparison values below the main diagonal of the comparison matrix; and storing results of the comparison operation and the different operation in the comparison matrix.

21. The non-transitory machine readable medium of claim 20, wherein the different operation is a different comparison operation than the comparison operation.

22. The non-transitory machine readable medium of claim 21, wherein the comparison operation is one of a greater than or equal to operation and a greater than operation, and the different comparison operation is the other.

23. The non-transitory machine readable medium of claim 20, wherein the different operation is an anti-symmetrical operation to be performed on the numerically unsorted index elements of the at least one input vector corresponding to storage of comparison values above the main diagonal of the comparison matrix.

24. The non-transitory machine readable medium of claim 23, wherein the anti-symmetrical operation is to invert, with a thermometer constant matrix, a comparison value into an inverted comparison value for each of the numerically unsorted index elements of the at least one input vector corresponding to storage of comparison values above the main diagonal of the comparison matrix.

* * * * *